United States Patent
Kunigita et al.

(10) Patent No.: US 10,034,032 B2
(45) Date of Patent: Jul. 24, 2018

(54) INFORMATION PROCESSING DEVICE, INFORMATION PROCESSING SYSTEM, CONTENT IMAGE GENERATING METHOD, AND CONTENT DATA GENERATING METHOD FOR AUTOMATICALLY RECORDING EVENTS BASED UPON EVENT CODES

(71) Applicant: SONY INTERACTIVE ENTERTAINMENT INC., Tokyo (JP)

(72) Inventors: Hisayuki Kunigita, Kanagawa (JP); Seung-Hyun Lee, Seoul (KR); Taek-Joo Lee, Seoul (KR); Ju-Yeong Ji, Seoul (KR)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 0 days.

(21) Appl. No.: 15/126,067

(22) PCT Filed: Feb. 25, 2015

(86) PCT No.: PCT/JP2015/055423
§ 371 (c)(1),
(2) Date: Sep. 14, 2016

(87) PCT Pub. No.: WO2015/151660
PCT Pub. Date: Oct. 8, 2015

(65) Prior Publication Data
US 2017/0105029 A1    Apr. 13, 2017

(30) Foreign Application Priority Data
Apr. 2, 2014 (JP) .................................. 2014-076452

(51) Int. Cl.
*H04N 21/239* (2011.01)
*H04N 21/8405* (2011.01)
(Continued)

(52) U.S. Cl.
CPC .......... *H04N 21/239* (2013.01); *A63F 13/35* (2014.09); *A63F 13/63* (2014.09); *A63F 13/833* (2014.09);
(Continued)

(58) Field of Classification Search
None
See application file for complete search history.

(56) References Cited

U.S. PATENT DOCUMENTS 8,978,075 B1 * 3/2015 Kaiser ...................... H04N 5/44
725/105
9,258,597 B1 * 2/2016 Clayton ............. H04N 21/4882
(Continued)

FOREIGN PATENT DOCUMENTS

JP    2002-191868 A    7/2002
JP    2009-247563 A    10/2009
(Continued)

OTHER PUBLICATIONS

International Search Report and Written Opinion dated May 19, 2015, from the corresponding PCT/JP2015/055423.
(Continued)

*Primary Examiner* — Hoang Vu A Nguyen Ba
(74) *Attorney, Agent, or Firm* — Katten Muchin Rosenman LLP

(57) ABSTRACT

A game executing section 112 performs a game program. A status data notifying section 116 notifies a download processing section 120 of status data indicative of the status of game execution of the currently executed game program. A request transmitting section 146 transmits to a content server a search request including the status data as metadata. A candidate image generating section 136 generates images regarding a plurality of content candidates resulting from
(Continued)

search through the server. A content image generating section 138 generates an image of the selected content.

10 Claims, 14 Drawing Sheets

(51) Int. Cl.

| | |
|---|---|
| *H04N 21/442* | (2011.01) |
| *H04N 21/845* | (2011.01) |
| *H04N 21/482* | (2011.01) |
| *A63F 13/35* | (2014.01) |
| *A63F 13/63* | (2014.01) |
| *A63F 13/86* | (2014.01) |
| *A63F 13/833* | (2014.01) |
| *H04N 21/4788* | (2011.01) |
| *H04N 21/2743* | (2011.01) |
| *H04N 21/437* | (2011.01) |
| *H04N 21/278* | (2011.01) |

(52) U.S. Cl.
CPC ........... *A63F 13/86* (2014.09); *H04N 21/278* (2013.01); *H04N 21/2743* (2013.01); *H04N 21/437* (2013.01); *H04N 21/44204* (2013.01); *H04N 21/44213* (2013.01); *H04N 21/4788* (2013.01); *H04N 21/4828* (2013.01); *H04N 21/8405* (2013.01); *H04N 21/845* (2013.01)

(56) References Cited

U.S. PATENT DOCUMENTS

| | | | |
|---|---|---|---|
| 2003/0028889 A1* | 2/2003 | McCoskey | H04N 7/17318 |
| | | | 725/91 |
| 2006/0095543 A1* | 5/2006 | Ito | G06F 17/30017 |
| | | | 709/218 |
| 2012/0054793 A1* | 3/2012 | Kang | H04L 12/2812 |
| | | | 725/38 |
| 2013/0184040 A1 | 7/2013 | Nonaka et al. | |
| 2014/0349753 A1 | 11/2014 | Imai et al. | |
| 2017/0111710 A1* | 4/2017 | Chae | H04N 21/8133 |
| 2017/0127135 A1* | 5/2017 | Chung | H04N 21/4781 |

FOREIGN PATENT DOCUMENTS

| | | |
|---|---|---|
| JP | 2010-224814 A | 10/2010 |
| JP | 2011-516103 T | 5/2011 |
| JP | 2013-128586 A | 7/2013 |
| WO | 2009/102991 A1 | 8/2009 |
| WO | 2013/111246 A1 | 8/2013 |

OTHER PUBLICATIONS

International Preliminary Report on Patentability dated Oct. 13, 2016, from the corresponding PCT/JP2015/055423.

Notification of Reason for Refusal dated May 15, 2018, from the corresponding Japanese Patent Application No. 2017-153449.

* cited by examiner

FIG.2
(a)
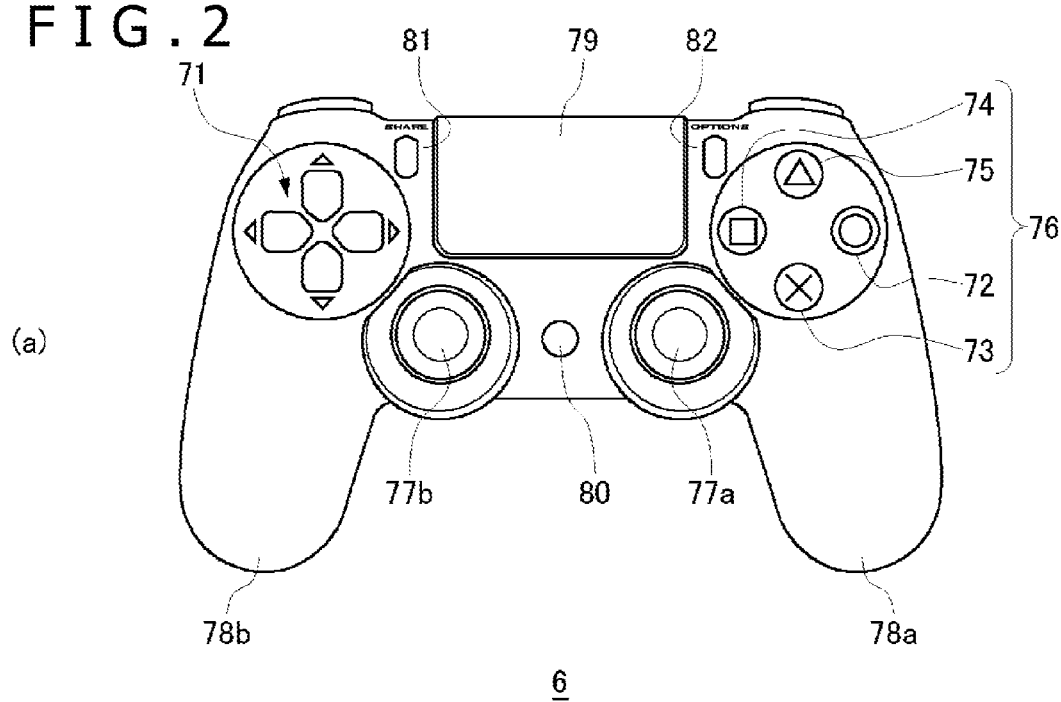
(b)
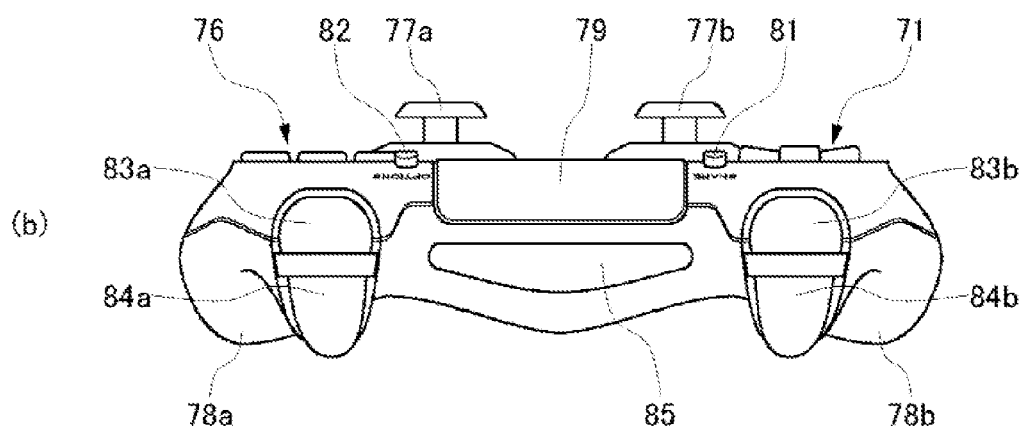

INFORMATION PROCESSING DEVICE, INFORMATION PROCESSING SYSTEM, CONTENT IMAGE GENERATING METHOD, AND CONTENT DATA GENERATING METHOD FOR AUTOMATICALLY RECORDING EVENTS BASED UPON EVENT CODES

TECHNICAL FIELD

The present invention relates to a technique for viewing content images such as those of games and a technique for implementing the viewing of content images.

BACKGROUND ART

Various social networking services (SNS) are currently utilized by large numbers of people as their communication tool. Services that allow videos generated or captured by users to be shared by other users have also gained widespread use. These services enable users to share diverse information with other users on networks. Video-sharing sites offer an environment in which users post videos and view videos.

SUMMARY

Technical Problem

When posting a video to a video-sharing site, the user inputs metadata such as a title and a comment and sends them to the site along with the video data. When viewing a video, the user inputs a search keyword to the video-sharing site to get a list of retrieved videos. Selecting a desired video from the video list causes the video data to be distributed.

One problem with the existing video-sharing services is that the user generally has a hard time gaining access to the desired video. One reason for this problem is that it is difficult for the user to input an appropriate search keyword at the time of retrieving a video. Another reason is that the videos posted to the video-sharing site are typically devoid of appropriate metadata. Although the existing video-sharing sites have large numbers of accumulated videos, the sites have had difficulty offering videos as desired by users.

It is therefore an object of the present invention to provide techniques for generating an environment that allows content images matching a user's status to be offered.

Solution to Problem

In solving the above problem and according to one mode of the present invention, there is provided an information processing device including: a metadata acquiring section that acquires metadata indicative of the status of application execution from a currently executed application; a request transmitting section that transmits to a server a search request for content including metadata; a content acquiring section that acquires content data from the server; and an image generating section that generates an image of the acquired content.

According to another mode of the present invention, there is provided an information processing system including an information processing device and a server connected with one another via a network. The information processing device includes: a metadata acquiring section that acquires metadata indicative of the status of application execution from a currently executed application; a request transmitting section that transmits to a server a search request for content including metadata; a search result acquiring section that acquires the result of content search from the server; a first image generating section that generates images regarding a plurality of content items as the result of search in the server; a content acquiring section that acquires content data from the server; and a second image generating section that generates an image of the acquired content. The server includes: a content recording section that records the content data; a search processing section that searches for content on the basis of the metadata included in the search request; a first transmitting section that transmits the result of content search; and a second transmitting section that transmits the content data.

According to a further mode of the present invention, there is provided an information processing device including: a recording section that records image data of a currently executed application; a metadata acquiring section that acquires metadata indicative of the status of application execution from the currently executed application; and a content generating section that extracts, as content data, application image data ranging from a start point to an end point from the application image data recorded in the recording section. The content generating section attaches to the content data the metadata over a period from the start point to the end point.

According to an even further mode of the present invention, there is provided an information processing device including: a transmission processing section that transmits image data of a currently executed application to a server; and a metadata acquiring section that acquires metadata indicative of the status of application execution from the currently executed application. The transmission processing section transmits to the server the metadata acquired by the metadata acquiring section while the application image data is being transmitted to the server.

According to a still further mode of the present invention, there is provided a content image generating method including: a step of acquiring metadata indicative of the status of application execution from a currently executed application; a step of transmitting a search request for content including metadata; a step of acquiring content data; and a step of generating an image of the acquired content.

According to a yet further mode of the present invention, there is provided a content data generating method including: a step of acquiring metadata indicative of the status of application execution from a currently executed application; a step of extracting, as content data, image data ranging from a start point to an end point from a recording section recording the image data of the currently executed application; and a step of attaching to the content data the metadata over a period from the start point to the end point.

Where other combinations of the above-outlined composing elements or the above expressions of the present invention are converted between different forms such as a method, a device, a system, a recording medium, and a computer program, they still constitute effective modes of this invention.

BRIEF DESCRIPTION OF DRAWINGS

FIG. 2 (a) is a schematic view showing a top side external configuration of an input device, and (b) is a schematic view showing a back side external configuration of the input device.

DESCRIPTION OF EMBODIMENTS

Figure 1:
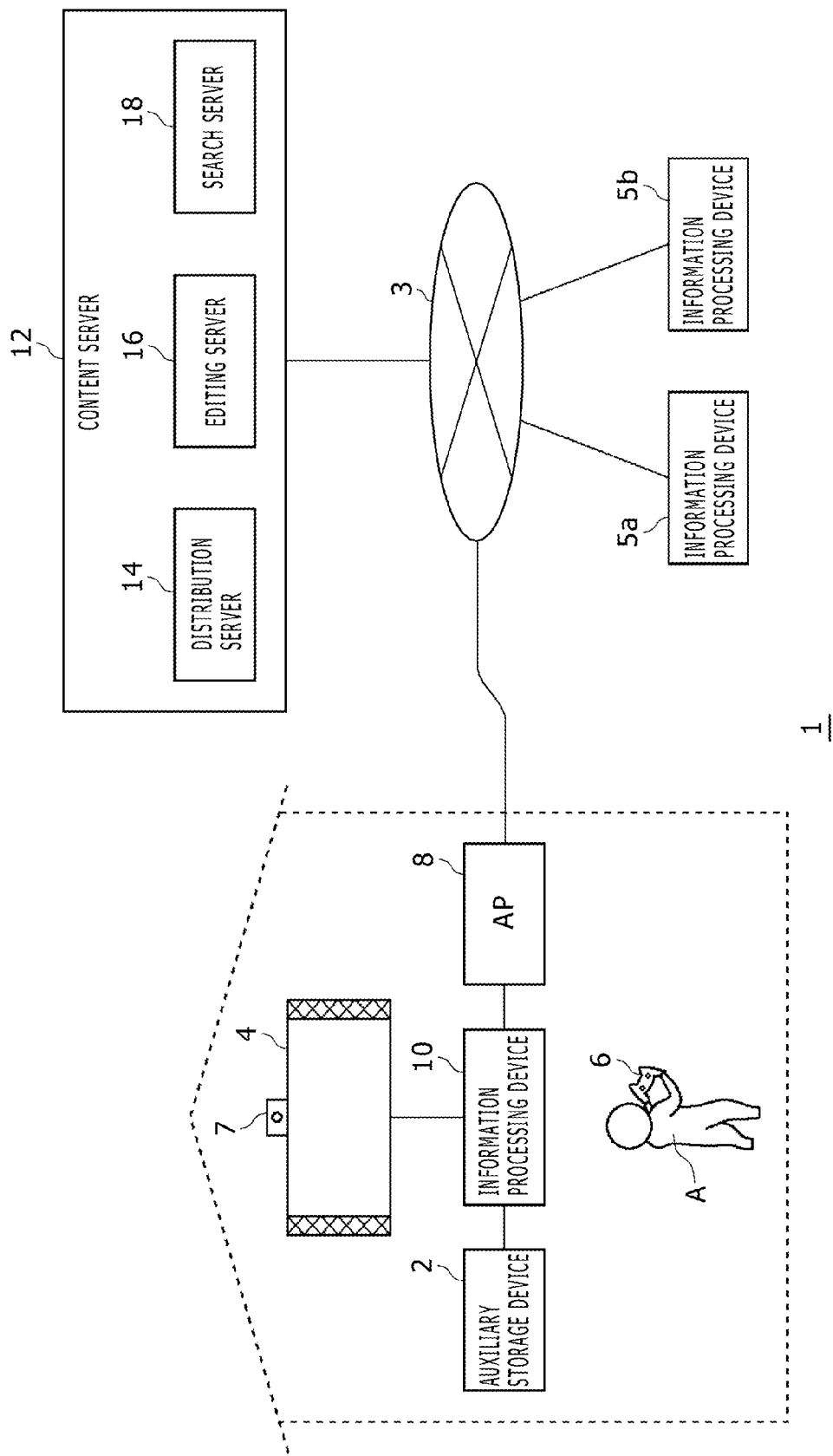
FIG. 1 is a schematic view showing an information processing system as an embodiment of the present invention.

FIG. 1 shows an information processing system 1 as one embodiment of the present invention. The information processing system 1 includes an information processing device 10 for use by a user A, information processing devices 5a and 5b for use by other users, and a content server 12. These components are interconnected via network 3 such as the Internet or a local area network (LAN). The content server 12 offers services related to content such as game videos. Here, the content server 12 is conceived as an entity that integrates a distribution server 14, an editing server 16, and a search server 18. The distribution server 14 offers the service of distributing application images such as game videos to users. For example, the distribution server 14 may be a video-sharing site distributing user-posted video data and the video data edited by the editing server 16. The editing server 16 offers the service of editing the video data provided by users. The search server 18 offers the service of presenting a user with video candidates that may be provided by the distribution server 14 in response to a video search request from the user.

The distribution server 14, editing server 16, and search server 18 may be configured as separate servers communicating with one another via the network 3. Alternatively, all of these servers may be integrated into one server; the distribution server 14 and editing server 16 may be integrated into one server; the distribution server 14 and search server 18 may be integrated into one server; or the editing server 16 and search server 18 may be integrated into one server. For example, if the distribution server 14 has only the simple function of storing video data and distributing the user-designated video data, then the editing server 16 and search server 18 may be configured to be intelligent servers for processing the metadata attached to the video data. If the metadata about videos is not embedded in the video data, the editing server 16 or the search server 18 may accumulate the metadata about the video data apart from the video data accumulated by the distribution server 14 in order to perform the process of editing or retrieving the video data.

An access point (AP) 8 has the functions of a wireless access point and a router. The information processing device 10 is connected to the AP 8 in wireless or wired fashion for communicable connection to the content server 12 on the network 3. The information processing devices 5a and 5b (also generically called the information processing device 5 if there is no need to distinguish them from each other) are likewise connected communicably to the content server 12. The information processing devices 10 and 5 may be of the same type or may be of a different device type each. The information processing devices 10 and 5 need only be capable of at least receiving content from the content server 12 and reproducing and displaying the received content.

The information processing device 10 is connected in wireless or wired fashion to an input device 6 operated by the user. The input device 6 outputs to the information processing device 10 operating information indicative of the result of the user's operation. Upon receipt of the operating information from the input device 6, the information processing device 10 gets the received information reflected in the processing of system software or application software and causes an output device 4 to output the processing result. In the information processing system 1, the information processing device 10 may be a game device that executes games, and the input device 6 may be a game controller or like device that supplies the information processing device 10 with the operating information from the user. In order to play a game, the user logs in to the operating system (OS; also known as system software) of the information processing device 10. The login user is managed by a user account registered in the information processing device 10.

The distribution server 14 offers the service of allowing the image data uploaded from the information processing devices 10 and 5 to be shared. In response to a request from the user, the distribution server 14 provides on-demand distribution of accumulated image data. The distribution server 14 also has the function of distributing live the image data provided in real time from the user. In the information processing system 1, the number of distribution servers 14 is not limited to one; there may be provided two or more distribution servers 14. The image distributing service provided by the distribution server 14 may be limited to registered members only, or may be open to the public.

The editing server 16 has the function of editing image data provided by the user. For example, on the basis of event codes identifying an event that has occurred in an application, the editing server 16 extracts the portion of image data corresponding to the event codes as content data and generates edited content data. The event codes, along with the accompanying time information, determine a start point and an end point according to which content data is extracted from image data. The editing server 16 extracts content data on the basis of the event codes. For example, the editing server 16 may extract from a baseball game video a scene in which the batter hit a homerun to generate an event video (content) lasting a predetermined time period (e.g., 10 seconds). On the basis of the event codes indicating the homerun hit during the baseball game, along with the accompanying time information, the editing server 16 determines the start point and end point of the scene to be extracted from the recorded video data about baseball game plays, and extracts the scene of the homerun hit from the video data to generate a homerun video. The editing server 16 may edit images on time using the event codes and the image data provided by the user in real time. Alternatively, after all image data and event codes have been provided, the editing server 16 may edit the images in batches or in a suitably timed manner as needed. The editing server 16 feeds the generated content data to the distribution server 14 so that the latter can distribute the data.

On receiving a content search request from the user, the search server 18 searches for the requested content by referencing the metadata about the content recorded in the distribution server 14. The content search request includes information indicative of the user's status such as the status data about the game currently played by the user. The search server 18 compares the status data with the content metadata to search for a game video that matches the user's status. In order to improve the efficiency of search, the search server 18 may link the content metadata to content identifiers (IDs) in its storage.

An auxiliary storage device 2 is a mass storage device such as a hard disk drive (HDD) or a flash memory. The auxiliary storage device 2 may be an external storage device connected to the information processing device 10 via a universal serial bus (USB), for example. Alternatively, the auxiliary storage device 2 may be an internal storage device. The output device 4 may be a television set that has a display unit configured to output images and speakers for outputting sound. Alternatively, the output device 4 may be a computer display. The output device 4 may be connected to the information processing device 10 wirelessly or by cable.

A camera 7 is an imaging device installed near the output device 4 to image the space nearby. Although FIG. 1 shows an example in which the camera 7 is attached to the top of the output device 4, the camera 7 may be set up alternatively beside the output device 4. In any case, the camera 7 is positioned in a manner imaging the user playing a game in front of the output device 4. The camera 7 may be a stereo camera. The input device 6 is configured to have a plurality of input sections including multiple operating push-buttons, analog sticks capable of inputting analog quantities, and rotary buttons.

The button configuration of the input device 6 is explained below.

Configuration of the Top Side

FIG. 2(a) shows a top side external configuration of the input device. To operate the input device 6, the user holds a left-side grip 78b by the left hand and a right-side grip 78a by the right hand. Arrow keys 71, analog sticks 77a and 77b, and four operation buttons 76 are provided on the housing top of the input device 6 as the input sections. The four buttons 72 to 75 are distinguished from each other by the color and shape marked on them. That is, the ○ button 72 is marked with a red circle, the X button 73 with a blue cross, the □ button 74 with a purple rectangle, and the Δ button 75 with a green triangle. A touch pad 79 is provided in a flat area between the arrow keys 71 and the operation buttons 76 on the housing top. The touch pad 79 also functions as a depressible button that is depressed when pressed by the user and returns to its initial position when released.

A function button 80 is provided between the two analog sticks 77a and 77b. The function button 80 is used to apply power to the input device 6 and to activate simultaneously a communicating function connecting the input device 6 to the information processing device 10. After the input device 6 is connected to the information processing device 10, the function button 80 is also used to display a menu screen on the information processing device 10.

A SHARE button 81 is provided between the touch pad 79 and the arrow keys 71. The SHARE button 81 is used to input the user's instructions to the OS or system software of the information processing device 10. An OPTIONS button 82 is provided between the touch pad 79 and the operation buttons 76. The OPTIONS button 82 is used to input the user's instructions to an application (game) executed by the information processing device 10. The SHARE button 81 and the OPTIONS button 82 may each be formed as a push-button.

Configuration of the Back Side

FIG. 2(b) shows a back side external configuration of the input device. The touch pad 79 extends from the housing top onto the housing back side of the input device 6. A horizontally elongated light-emitting section 85 is provided toward the bottom of the housing back side. The light-emitting section 85 has red (R), green (G), and blue (B) light-emitting diodes (LEDs) and is illuminated in accordance with luminescent color information sent from the information processing device 10.

On the housing back side, an upper button 83a and a lower button 84a are positioned in symmetric relation to an upper button 83b and a lower button 84b in a longitudinal direction. The upper button 83a and the lower button 84a are operated by the index finger and the middle finger, respectively, of the user's right hand. The upper button 83b and the lower button 84b are operated by the index finger and the middle finger, respectively, of the user's left hand. As illustrated, the light-emitting section 85 is positioned between a right-side bank of the upper button 83a and lower button 84a and a left-side bank of the upper button 83b and lower button 84b. This arrangement prevents the light-emitting section 85 from being hidden by the index fingers or middle fingers operating the buttons. That in turn allows the camera 7 suitably to image the light-emitting section 85 being illuminated. The upper buttons 83 may be formed as a push-button each and the lower buttons 84 as a pivotably supported trigger button each.

Figure 3:
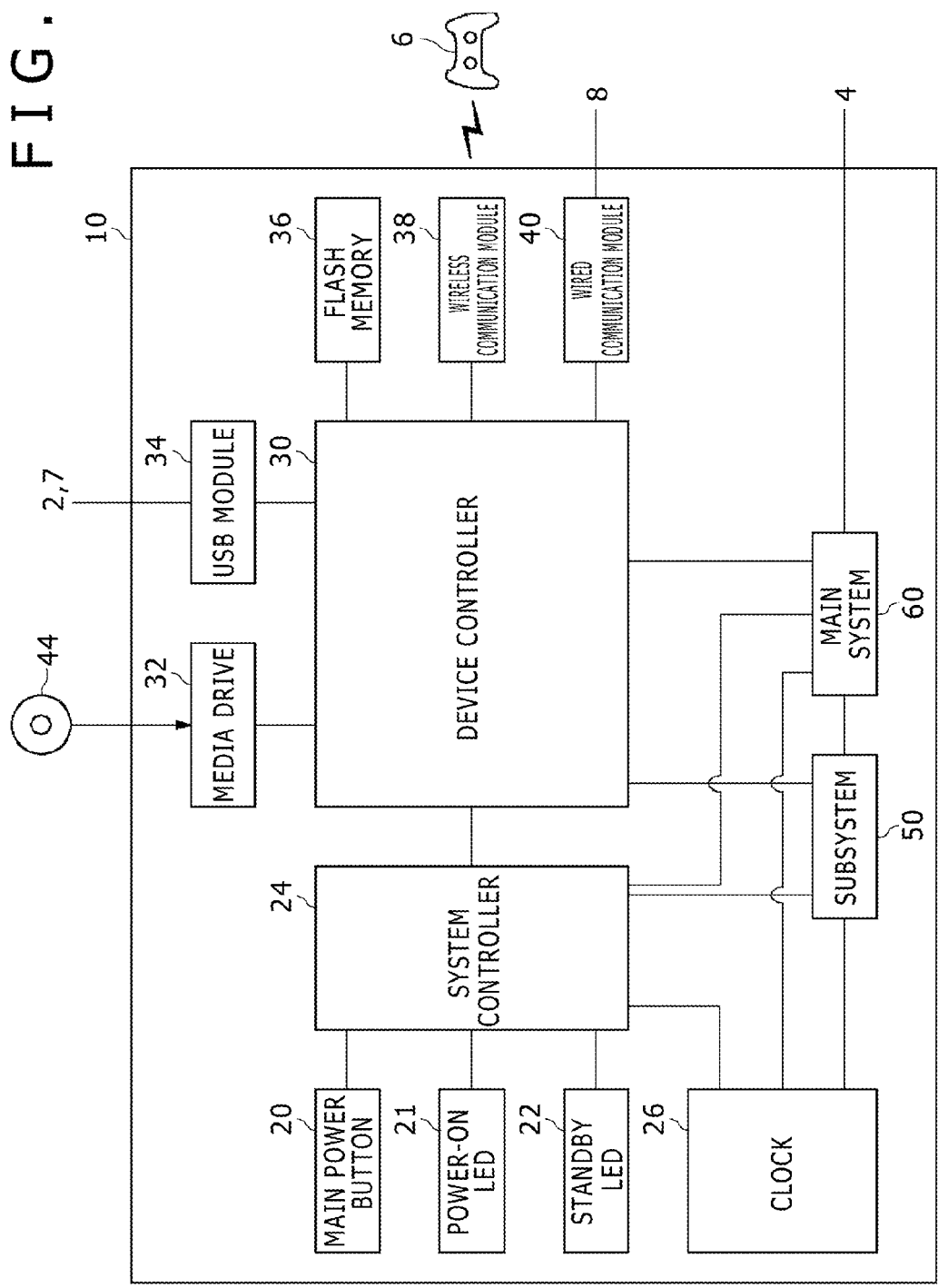
FIG. 3 is a functional block diagram of an information processing device.

FIG. 3 is a functional block diagram of the information processing device 10. The information processing device 10 is configured to have a main power button 20, a power-on LED 21, a standby LED 22, a system controller 24, a clock 26, a device controller 30, a media drive 32, a USB module 34, a flash memory 36, a wireless communication module 38, a wired communication module 40, a subsystem 50, and a main system 60.

The main system 60 includes a main central processing unit (CPU), a main memory equipped with a memory controller, and a graphics processing unit (GPU). The GPU is used primarily for arithmetically processing game programs. These functions may be configured as a system-on-chip and formed on a single chip. The main CPU has the function of executing game programs recorded in the auxiliary storage device 2.

The subsystem 50 includes a sub CPU and a main memory equipped with a memory controller. The subsystem 50 has no GPU and does not have the function of executing game programs. The number of circuit gates in the sub CPU is smaller than in the main CPU. The operating power consumption of the sub CPU is less than that of the main CPU. The sub CPU continues to operate when the main CPU is in a standby state. For this reason, the processing functions of the sub CPU are limited so as to minimize its power consumption.

The main power button 20 is an input section to which the user performs operation input. Positioned on the housing front of the information processing device 10, the main power button 20 is operated to turn on or off the supply of power to the main system 60 of the information processing device 10. The power-on LED 21 is illuminated when the main power button 20 is turned on. The standby LED 22 is illuminated when the main power button 20 is turned off.

The system controller 24 detects whether the main power button 20 is pressed by the user. With the main power turned off, pressing the main power button 20 causes the system controller 24 to acquire the pressing operation as an "ON instruction." With the main power turned on, pressing the main power button 20 causes the system controller 24 to acquire the pressing operation as an "OFF instruction."

The clock 26 is a real-time clock that generates current date and time information and supplies the generated information to the system controller 24, subsystem 50, and main system 60.

The device controller 30 is configured as a large-scale integrated circuit (LSI) which, like a southbridge, permits transfer of information between devices. As illustrated, the device controller 30 is connected with such devices as the system controller 24, media drive 32, USB module 34, flash memory 36, wireless communication module 38, wired communication module 40, subsystem 50, and main system 60. The device controller 30 buffers differences in electrical characteristics and in data transfer rates between the connected devices and thereby controls the timing of data transfer.

The media drive 32 is a drive device which is loaded with a read-only memory (ROM) medium 44 carrying application software such as games and license information and which drives the loaded ROM medium 44 to read programs and data therefrom. The ROM medium 44 is a read-only recording medium such as an optical disk, a magneto-optical disk, or a Blu-ray disk.

The USB module 34 is connected to an external device by means of a USB cable. The USB module 34 may be connected to the auxiliary storage device 2 and to the camera 7 by USB cable. The flash memory 36 is an auxiliary storage device that constitutes an internal storage. The wireless communication module 38 communicates wirelessly with the input device 6, for example, under communication protocols such as the Bluetooth (registered trademark) protocol or the Institute of Electrical and Electronic Engineers (IEEE) 802.11 protocol. The wireless communication module 38 may support a third-generation digital mobile phone system complying with the International Mobile Telecommunication 2000 (IMT-2000) standard stipulated by the International Telecommunication Union (ITU), or support a digital mobile phone system of another generation. The wired communication module 40 communicates by wire with an external device. For example, the wired communication module 40 is connected to the network 3 by way of the AP 8.

The information processing device 10 of this embodiment has the function of transmitting content to the content server 12 and the function of receiving content therefrom. These two functions are explained below.

<Content Transmitting Function>

Figure 4:
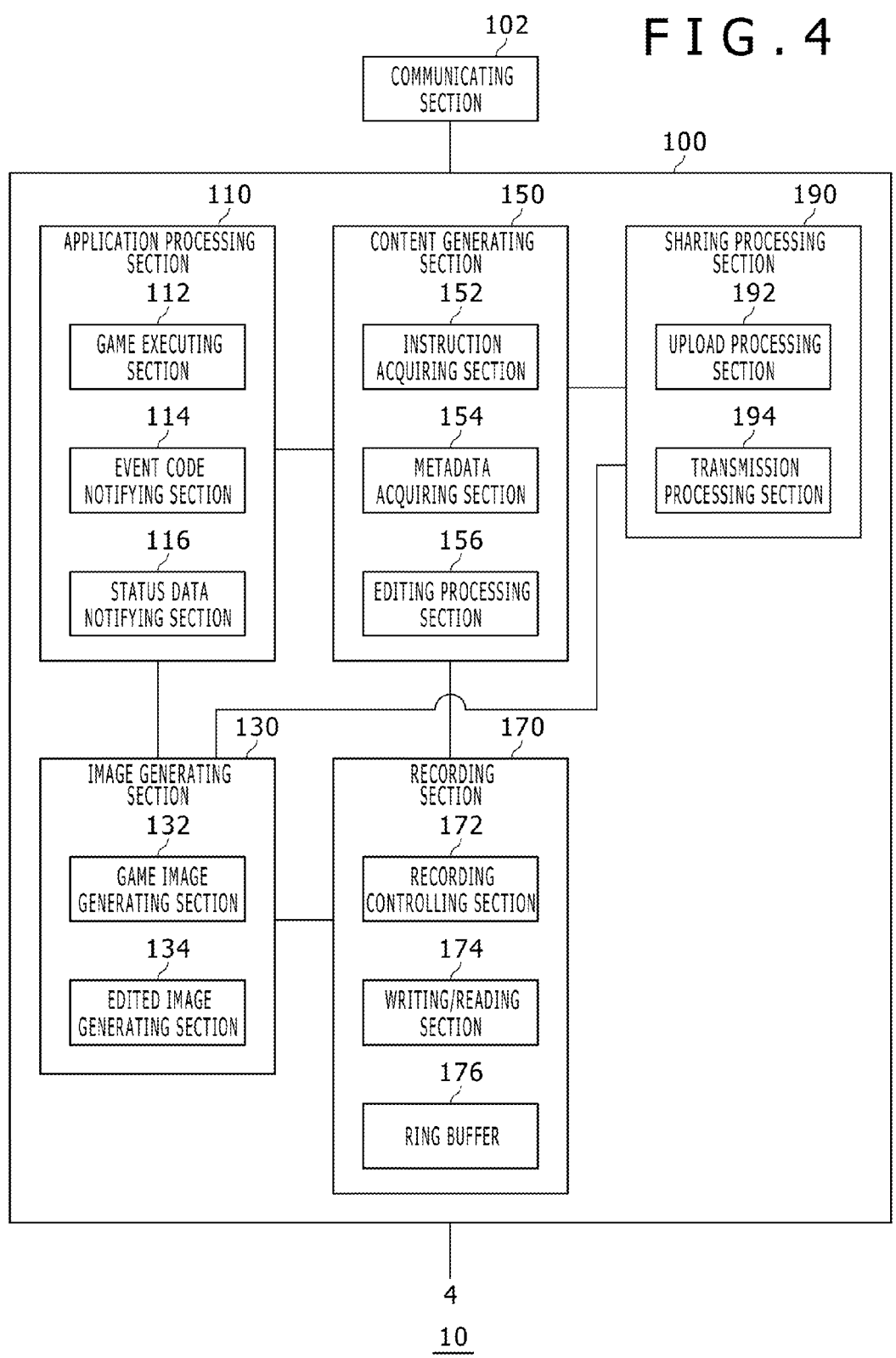
FIG. 4 is a schematic view showing an internal structure of an information processing device that implements a content transmitting function.

The information processing device 10 has the function of transmitting content to the content server 12 for on-demand distribution thereby and of transmitting content to the content server 12 for live distribution thereby. FIG. 4 shows an internal structure of the information processing device 10 that implements the content transmitting function. The information processing device 10 has a processing section 100 and a communicating section 102. The processing section 100 includes an application processing section 110, an image generating section 130, a content generating section 150, a recording section 170, and a sharing processing section 190. The application processing section 110 performs processes on applications. The image generating section 130 performs the process of generating images for display on the output device 4. The content generating section 150 performs processes on the editing of application images. The recording section 170 performs the process of recording application image data for up to a predetermined time period. The sharing processing section 190 performs the process of transmitting application image data to the content server 12.

The components shown in FIG. 4 as the functional blocks configured to perform diverse processes may be configured by hardware in the form of circuit blocks, memories, and LSI for example, or by software using programs loaded into a memory for example. It will thus be appreciated by those skilled in the art that these functional blocks are configured by hardware only, by software only, or by a combination thereof in diverse forms and are not limited to any one of such forms.

In the information processing system 1 of this embodiment, the communicating section 102 receives the information input by the user operating an input section of the input device 6 (the information may be called the operating information hereunder where appropriate). The communicating section 102 also transmits to the content server 12 the image data generated or acquired by the processing section 100. The image data includes at least the image data generated by the image generating section 130 and the image data (content data) edited by the content generating section 150. The communicating section 102 is configured to have the functions of both the wireless communication module 38 and the wired communication module 40 shown in FIG. 3. The wireless communication module 38 handles communication with the input device 6, and the wired communication modules 40 deals with communication with the content server 12.

The application processing section 110 includes a game executing section 112, an event code notifying section 114, and a status data notifying section 116. The game executing section 112 has the function of executing programs to make the game proceed in response to the user's operation input through the input device 6. When a predetermined event takes place during execution of the game, the event code notifying section 114 outputs information identifying the event (called the event code hereunder) to the content generating section 150. Incidentally, events are set in each game. For example, a baseball game may have events such as "bases loaded with two outs," "overtaking the opponent's 2-point lead in an inning," "base stolen," and "homer hit" set therein. The event code notifying section 114 has the function of notifying the content generating section 150 of the event code of any of such set events when it takes place. The status data notifying section 116 notifies the content generating section 150 of the status data about the game. The status data notifying section 116 may notify the content generating section 150 of the status data in response to a request from the latter. Alternatively, upon a change in the status for example, the status data notifying section 116 may notify the content generating section 150 of the changed status data. At this time, the status data notifying section 116 may give notification of the status data constituting the difference between the unchanged and the changed status data. Alternatively, the status data notifying section 116 may collect all changed status data and give notification thereof.

Figure 5:
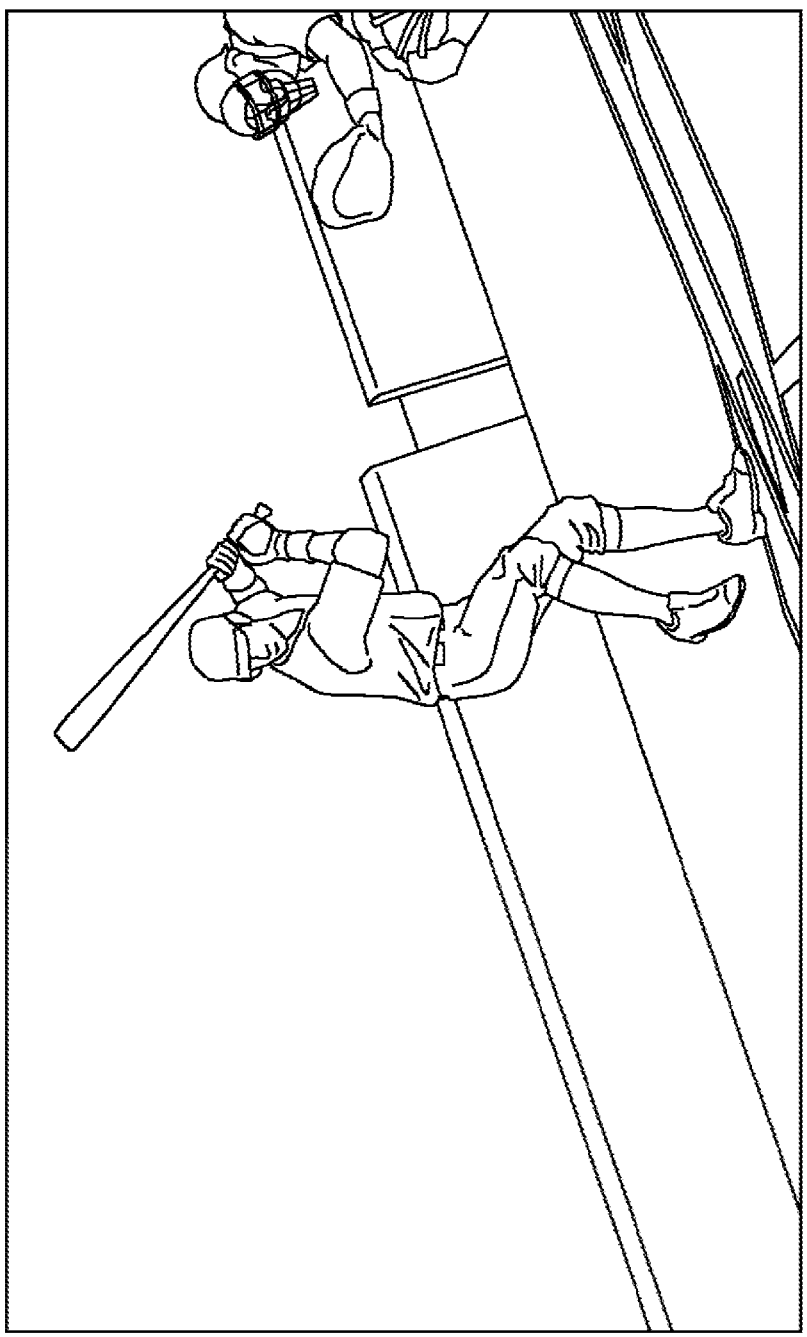
FIG. 5 is a schematic view showing a typical game screen.

The game executing section 112 performs arithmetic processing to move game characters in a virtual space on the basis of the operating information input by the user through the input device 6. In this manner, the game executing section 112 may be configured as a concept that includes the application (game program) itself. A game image generating section 132 may be a GPU executing the rendering process, for example. Upon receipt of the result of processing from the game executing section 112, the game image generating section 132 generates the image data about the application (game) to be displayed on the output device 4. FIG. 5 shows a typical game screen displayed on the output device 4. Although the game executing section 112 executes game programs in this embodiment, the game executing section 112 may alternatively execute other kinds of application programs.

In the information processing device 10, the recording section 170 includes a recording controlling section 172, a writing/reading section 174, and a ring buffer 176. The recording section 170 has the function of recording in the background the images to be displayed on the output device 4. The game image generating section 132 generates game image data and displays the generated image data on the display device 4, whereas the recording section 170 records the image data in the background.

The recording controlling section 172 controls the writing/reading section 174 to write and read data. The writing/reading section 174 writes or reads data to or from the ring buffer 176. The background recording by the recording section 170 is carried out in the ring buffer 176. The recording controlling section 172 generates the ring buffer 176 by setting a starting address and an ending address of the storage area in the auxiliary storage device 2. The ring buffer area may be set up beforehand at the shipment of the information processing device 10 from the factory. The recording controlling section 172 records to the ring buffer 176 the image data generated by the game image generating section 132 regarding the currently executed application. The recording controlling section 172 records to the ring buffer 176 the image data in a predetermined address sequence from the starting address on. Upon completion of the recording up to the ending address, the recording controlling section 172 returns to the starting address to start overwriting, and repeats the process. For example, the ring buffer 176 is set to record game images for up to 30 minutes. The recorded game images are provided with time information (timestamp). The timestamp may be given by the OS of the information processing device 10. With the display image data recorded to the ring buffer 176 in the background, the content generating section 150 can, upon occurrence of an event during the game, generate the content data that includes past image data before the event.

FIG. 5 shows a baseball game execution screen. The user is playing the baseball game here by operating the input device 6. Suppose now that while the game is in progress, an event set in the game program occurs. In that case, the event code notifying section 114 notifies the content generating section 150 of the event code of that event. For example, the event taking place may be any one of such diverse events as "bases loaded with two outs," "overtaking the opponent's 2-point lead in an inning," "base stolen," and "homer hit." The diverse events set in the game program contribute to providing a more fulfilling game image sharing service.

For example, if the baseball game comes bases loaded with two outs, the event code notifying section 114 notifies the content generating section 150 of the event code indicating the "bases loaded with two outs" event together with time information indicative of the event occurrence time. Thus a metadata acquiring section 154 automatically acquires from the currently executed application (game program) the event code indicating the occurrence of any of the events set in the application, along with the time information about the event. The event codes constitute the metadata attached to the content data, as will be discussed later.

When notified of an event code, the metadata acquiring section 154 requests notification of current status data from the status data notifying section 116. The status data notifying section 116 collects the status data indicating the status of execution of the application at the time of receiving the request. The status data notifying section 116 then notifies the metadata acquiring section 154 of the collected status data along with the time information indicative of the collection timing. Thus the metadata acquiring section 154 acquires as metadata the status data notified by the currently executed application (game program).

For example, the status data includes a scene ID identifying the scene in which the game is played. In the baseball game, the status data may further include user team information, opponent team information, inning information, batter information, and opponent pitcher information. The status data collected by the status data notifying section 116 is attached as metadata to the content uploaded to the content server 12, as will be discussed later. The content server 12 then uses the status data for content search. For this reason, the game program is configured to let the status data notifying section 116 collect a variety of status data, which improves the granularity of the search by the content server 12.

As described above, the ring buffer 176 records the game images of the past 30 minutes. The ring buffer 176 is successively overwritten in real time with the latest game images. Timestamps are attached to the game images recorded in the ring buffer 176. An editing processing section 156 waits for completion of the recording of the image data for a predetermined time period (e.g., one minute) from the start point designated by the time information about the event occurrence time to the ring buffer 176. With the recording completed, the editing processing section 156 reads from the ring buffer 176 the image data ranging from the start point to the end point identified by the event code and by the time information about the event occurrence time. The editing processing section 156 extracts the image data as the content data about the bases-loaded-with-two-outs event.

The editing processing section 156 attaches the metadata acquired by the metadata acquiring section 154 to the content data. At this time, by referencing the time information indicative of the timing at which the status data was collected, the editing processing section 156 attaches the status data collected over the period between the start point and the end point from which the content data was extracted, as metadata to the content data. When the editing processing section 156 edits game images in this manner, the metadata indicating in detail the status of the user's game play can be attached to the content data. Preferably, the metadata acquiring section 154 may acquire beforehand an application ID (title ID) identifying the application and the information identifying the user as the player, and the editing processing section 156 may add these items of information as metadata to the content data. The editing processing section 156 always attaches at least the application ID as metadata to the content data.

Figure 6:
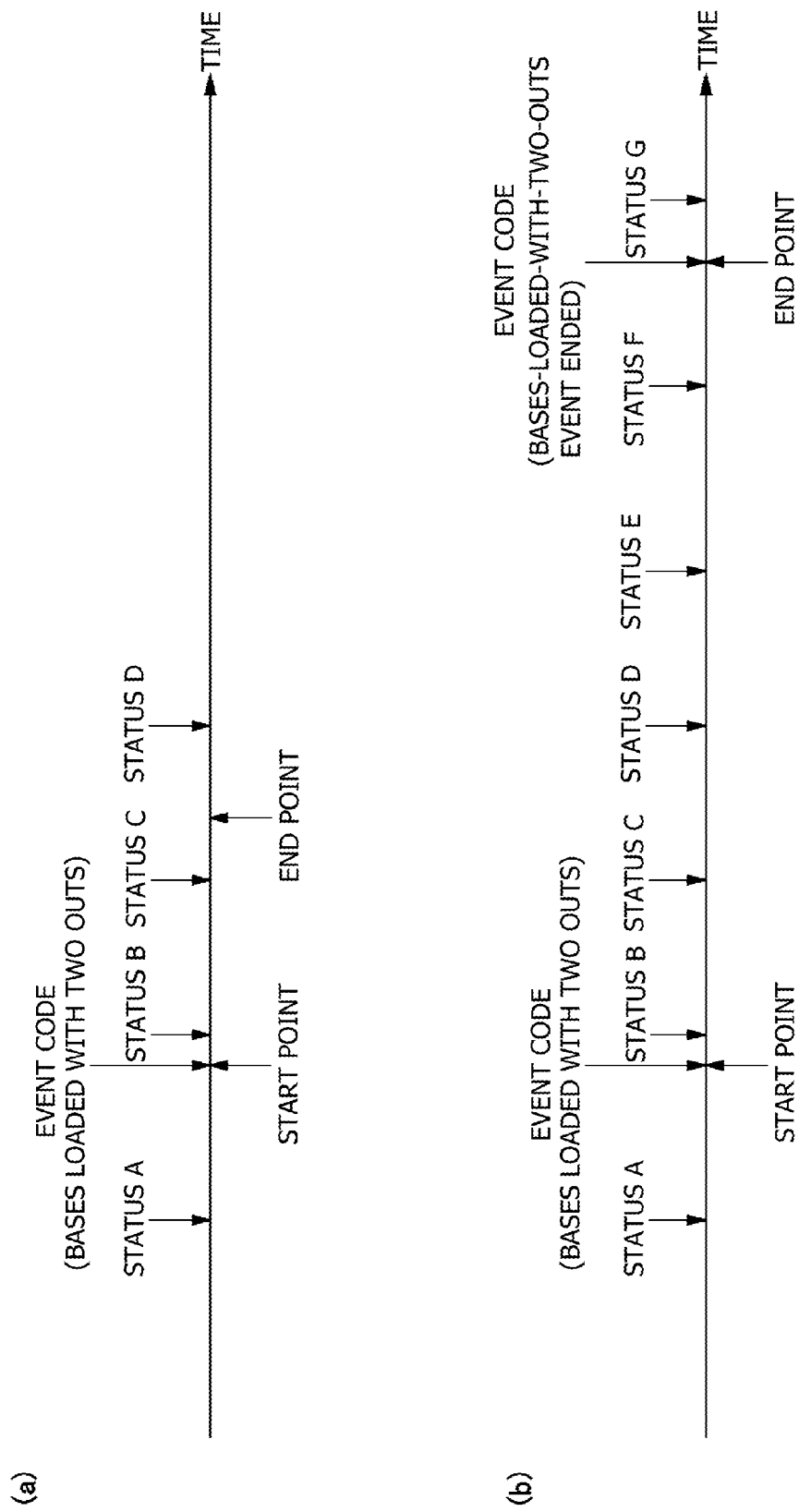
FIG. 6 (a) is a schematic view showing that the time at which an event occurred becomes a start point according to which content data is extracted, and (b) is a schematic view showing that two event codes designate a start point and an end point.

FIG. 6(*a*) shows an example in which the time at which an event occurred becomes a start point according to which content data is extracted. The end point for extraction of the content data is set to be a predetermined time period later (e.g., one minute) than the start point. In this example, the metadata acquiring section 154 is shown to have acquired status data A, B, C, and D. The status data B and C collected over the period from the start point to the end point are attached to the content data by the editing processing section 156. This allows the content data extracted from between the start point and the end point to be linked with the status data indicative of the play status of the game during that period.

With the above example, it was explained that the editing processing section 156 extracts as the content data the image data for a predetermined time period starting from the time the bases-loaded-with-two-outs event occurred. As another example, the image data from the occurrence of the bases-loaded-with-two-outs event until the end of the event may be extracted as the content data. At the end of the bases-loaded-with-two-outs chance in the baseball game, the event code notifying section 114 notifies the content generating section 150 of the event code indicating "bases-loaded-with-two-outs event ended," along with the time information about the event occurrence time. This allows the editing processing section 156 to recognize the end of the bases-loaded-with-two-outs event. The editing processing section 156 then reads from the ring buffer 176 the image data using the start point designated by the time information about the time "the bases-loaded-with-two-outs event occurred" and the end point designated by the time information about the time "the bases-loaded-with-two-outs event ended," the image data being extracted as the content data about the bases-loaded-with-two-outs event. The editing processing section 156 thus acquires the content data ranging from the start to the end of the bases-loaded-with-two-outs event. The editing processing section 156 attaches to the content data the metadata acquired by the metadata acquiring section 154 during the period from the start point to the end point. When the editing processing section 156 edits game images in this manner, the metadata indicating in detail the status of the user's game play can be attached to the content data.

FIG. 6(*b*) shows an example in which two event codes designate a start point and an end point. The time information for the first event code designates the start point at which extraction of content data started, and the time information for the next event code designates the end point at which extraction of the content data ended. In this example, the metadata acquiring section 154 acquires status data A, B, C, D, E, F, and G. The status data B, C, D, E, and F collected during the period ranging from the start point to the end point are attached to the content data by the editing processing section 156. This allows the content data extracted from between the start point and the end point to be linked with the status data indicative of the play status of the game during that period.

The process of content data extraction may be performed by the editing processing section 156 using different types of event codes notified by the event code notifying section 114. The typical event code types are defined as follows:
(1) In an event code type, an event code designates the time an event occurred as the start point as well as the time a predetermined time period later as the end point.

(2) In another event code type, an event code designating the start point is paired with another event code designating the end point.

Event code type identification information embedded in each event code allows the editing processing section 156 to recognize the event code type in use. In short, the difference between the two event code types is that the type (1) event code involves a single event code identifying both the start point and the end point, while the type (2) event code is a pair of event codes identifying the start point and the end point.

The type (1) event code includes information designating the period ranging from the start point to the end point. The period designated by the event code may be 10 seconds, 30 seconds, or 60 seconds, for example. Any one of these time periods may be selectively determined by the game maker with regard to each event. Upon receipt of the type (1) event code, the editing processing section 156 reads the image data ranging from the event occurrence time (start point) to the time a predetermined period later (end point) from the ring buffer 176 as the content data. A corresponding step in the above example is when the image data for one minute starting from the time the bases-loaded-with-two-outs event occurred is extracted and generated as the content data. A variation of the type (1) event code may involve supplementing the event code with time information designating the start point. For example, the event code may include information designating the time $\alpha$ second earlier than the event occurrence time as the start point and the time a predetermined time period later as the end point. Since the ring buffer 176 has the image data of the past 30 minutes recorded therein, the editing processing section 156 can set the start point and the end point of the content data as needed by taking advantage of the fact that the image data prior to the event occurrence can also be embedded in the content data. In another example, the event code may include information designating the time $\beta$ seconds later than the event occurrence time as the start time and the time a predetermined time period later as the end point. In this manner, the type (1) event code can designate the start point and the end point by itself.

The type (2) event code includes information identifying whether this event code designates the start point or the end point. In the example shown in FIG. 6(*b*), the event in which bases came to be loaded with two outs is identified by the event code designating the start point, and the event in which the bases-loaded-with-two-outs occurrence ended is identified by the event code designating the end point. The event code identifying the bases-loaded-with-two-outs occurrence and the event code identifying the end of the bases-loaded-with-two-outs occurrence are handled as an event code pair by the editing processing section 156. For example, each of the paired event codes includes information indicating that this event code is one of the pair. If the first code and the second code are assumed to be called an event start code and an event end code respectively, the event start code includes information indicating that an event started and the event end code includes information indicating that the event ended. Using this pair of event codes, the editing processing section 156 determines the start point and the end point of the image data to be extracted. Preferably, the event start code and the event end code may include time information designating the start point and the end point respectively. This enables the event start code to designate as the start point a time point before or after the time information in the event code and the event end code to designate as the end point a time point before or after the time information in the event code.

Explained below is another example of the type (2) event code with regard to the event of "overtaking the opponent's 2-point lead in an inning." This event can take place when the player at bat is 2 points behind in an inning. If the player is behind at the beginning of an inning, the event code notifying section 114 notifies the metadata acquiring section 154 of an event code indicating the 2-points-behind event. The metadata acquiring section 154 accumulates the status data notified after the occurrence of the 2-points-behind event so as to attach the accumulated status data to the content data about that event. As described above, when notified of the event code, the metadata acquiring section 154 may request current status data from the status data notifying section 116 so that the status data notifying section 166 notifies the metadata acquiring section 154 of the requested current status data. Alternatively, at every change in status, the status data notifying section 116 may notify the metadata acquiring section 154 of the changed status data. For example, if batters are changed or if a defensive substitution is made, the status data notifying section 116 recognizes a change in status, collects the status data at that point, and notifies the metadata acquiring section 154 of the collected status data. This enables the metadata acquiring section 154 to acquire and accumulate detailed metadata up to the overtaking of the opponent's 2-point lead. When the player has overtaken the opponent's 2-point lead during the game, the event code notifying section 114 notifies the metadata acquiring section 154 of an event code indicating the event of having overtaken the opponent's 2-point lead in an inning.

In the case above, the event code indicating the event of being 2 points behind and the event code indicating the event of having overtaken the opponent's 2-point lead in an inning are handled as one pair of event codes by the editing processing section 156. Using this pair of event codes, the editing processing section 156 determines the start point and the end point of the image data to be extracted. In this manner, the editing processing section 156 can extract from the ring buffer 176 the content data composed of a series of game images from the time the player was 2 points behind until the player overtook the opponent's 2-point lead in the same inning. The editing processing section 156 can further add the status data about that time period as metadata to the content data.

Whether or not the player can overtake the opponent's 2-point lead in an inning depends on the progress of the game. The player may not be able to overtake the opponent's lead. If that happens, the event code notifying section 114 at the end of the inning notifies the metadata acquiring section 154 of an event code indicative of the end of the inning. Upon receipt of the event code indicating the inning end, the metadata acquiring section 154 recognizes the player's failure to overtake the opponent's 2-point lead. The metadata acquiring section 154 may then discard the status data accumulated since the occurrence of the 2-points-behind event. The editing processing section 156 does not edit the image data. A corresponding step in the example of FIG. 6(b) is when the second event end code cannot be acquired. In this case, the status data accumulated since acquisition of the event start code may be discarded.

In the manner described above, the editing processing section 156 edits the image data recorded in the ring buffer 176 so as to generate the content data supplemented with metadata. The metadata may include information identifying the device type of the information processing device 10. If the game defines a user level indicating the user's degree of skill, the metadata may further include user level information as another piece of information about the user currently using the application. The editing processing section 156 can thus receive status data directly from the game and thereby add detailed information about the current game play status as metadata to the content data.

An upload processing section 192 uploads generated content data to the content server 12. Specifically, the upload processing section 192 uploads content data to the distribution server 14 so that other users can download the content data for viewing. This allows the user's play video to be shared by many people, which is expected to raise the popularity of the game.

How the content generating section 150 automatically generates content data was discussed above. Explained below is how the content generating section 150 generates content data as instructed by the user.

Figure 7:
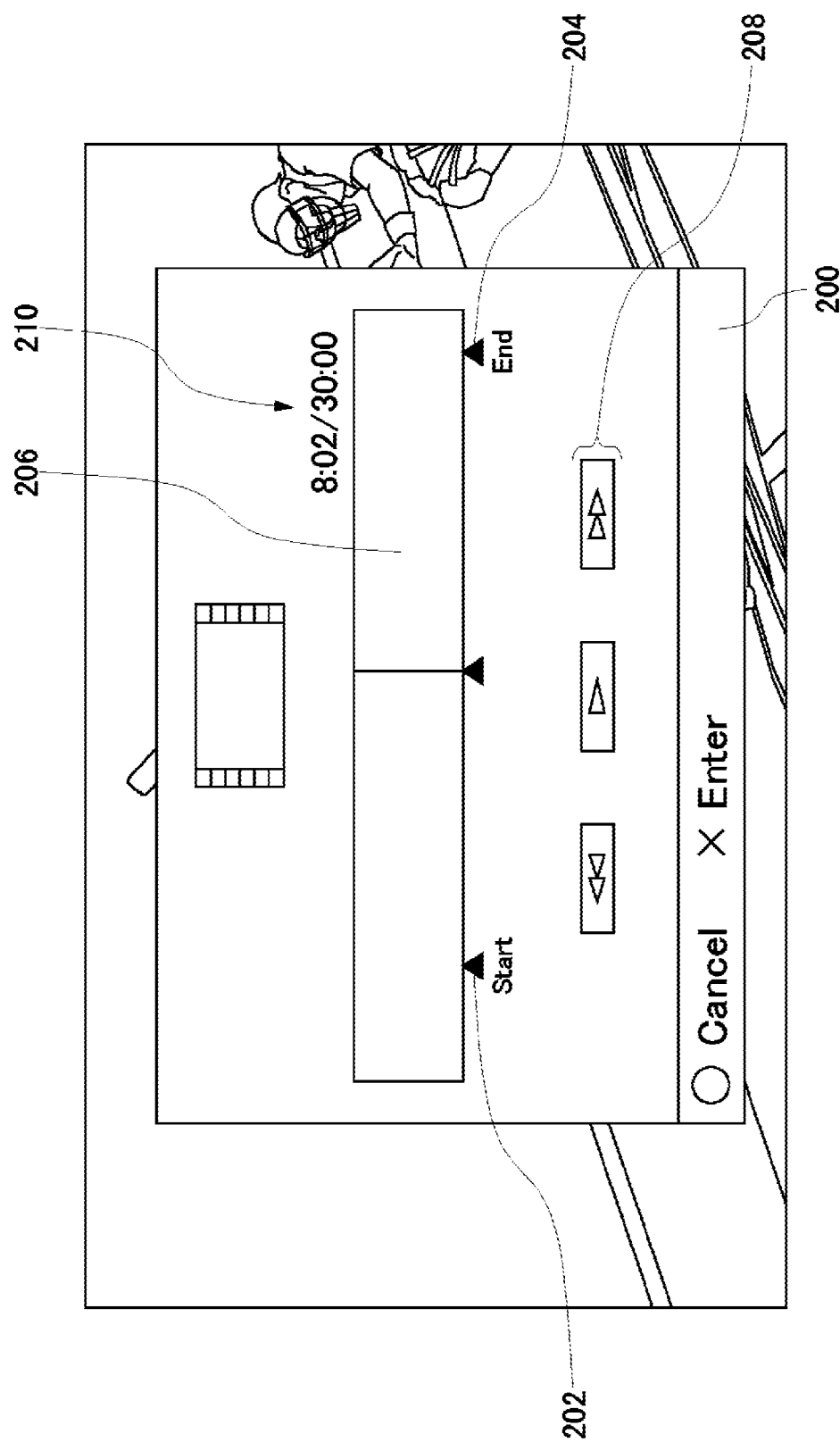
FIG. 7 is a schematic view showing a typical editing screen superimposed on a game screen.

FIG. 7 shows a typical editing screen superimposed on a game screen. When the user operates the input device 6 to give a screen editing instruction to the image generating section 130, an edited image generating section 134 generates an editing screen 200. Alternatively, the user may operate a predetermined button (e.g., SHARE button 81) on the input device 6 to display an editing button on the screen for selection. When the displayed editing button is selected, the screen editing instruction is sent to the image generating section 130.

On the editing screen 200, the user can determine the length of the video data to be uploaded. Specifically, the user determines a start point 202 and an end point 204 of image data of up to 30 minutes in length, to determine the image data between the start point 202 and the end point 204 as the target to be uploaded. The user can move the start point 202 and the end point 204 as desired by operating the input device 6. The image data is reproduced in an image display area 206. The user determines the start point 202 and the end point 204 of the video data to be uploaded while viewing the reproduced image and by operating indicators 208 such as a play button, a fast-forward button, and a rewind button. The left end of the image display area 202 denotes the beginning of the image data recorded in the ring buffer 176 (i.e., image recorded 30 minutes earlier), and the right end of the image display area 202 represents the end of the image data (i.e., the latest image). Arrangements can be made so that when the user points a cursor to a desired position in the image display area 206, the image at the corresponding position on the time base is displayed. Time information 210 indicates the relative time of the reproduced image in the past 30 minutes. The user determines the image data to be extracted by setting the start point 202 and the end point 204 and by pressing the Enter key.

When the user operates the Enter key, an instruction acquiring section 152 acquires an image data editing instruction as well as time information about the start point 202 and the end point 204 set through the editing screen 200. Every time the status of the ongoing game is changed, the status data notifying section 116 collects the status data and notifies successively the metadata acquiring section 154 of the collected status data along with the time information indicative of the collection timing. The metadata acquiring section 154 stores all collected status data together with all time information. The metadata acquiring section 154 may discard the metadata corresponding to the image data overwritten and deleted from the ring buffer 176, i.e., the metadata having the time information of more than 30 minutes ago.

As described above, the image data recorded in the ring buffer 176 is furnished with timestamps. The editing processing section 156 extracts from the ring buffer 176 the image data identified by the start point 202 and the end point 204 and acquires the extracted image data as the content data. At the same time, the editing processing section 156 attaches to the content data the status data acquired as metadata data by the metadata acquiring section 154 over the period between the start point and the end point of the image data. When the editing processing section 156 edits the game images as described in accordance with the user's editing instruction designating the start point and the end point, the metadata indicating in detail the status of the user's game play can be attached to the content data. The upload processing section 192 transmits the content data to the content server 12.

In the manner described above, large quantities of content data are sent to and stored in the content server 12. In particular, with the editing processing section 156 automatically editing the image data using event codes, there is no need for the user's intervention. The content server 12 is thus allowed automatically to collect large quantities of content data from numerous users. The user can determine whether the editing processing section 156 is allowed automatically to generate content data. If the user does not want automatic editing, the user need only make settings to inhibit automatic editing. With automatic editing inhibited, the user can still upload content data to the content server 12 through the editing screen 200 shown in FIG. 7.

Discussed above was the scheme in which the information processing device 10 generates content data and uploads the generated data. Alternatively, the content server 12 may generate content data. The process of image data generation is performed by the editing server 16.

As a precondition for the editing server 16 to edit image data, a transmission processing section 194 in the information processing device 10 transmits to the editing server 16 the image data generated by the game image generating section 132. The transmission processing section 194 also transmits to the editing server 16 the event codes notified by the event code notifying section 114 along with the time information about the event occurrence time. The transmission processing section 194 further transmits to the editing server 16 the status data notified by the status data notifying section 116 together with the time information about the status collection time. Preferably, every time the status of the ongoing game is changed, the status data notifying section 116 may notify the transmission processing section 194 of the changed status data. Whenever notified of the status data, the transmission processing section 194 may preferably transmit the status data to the editing server 16.

Figure 8:
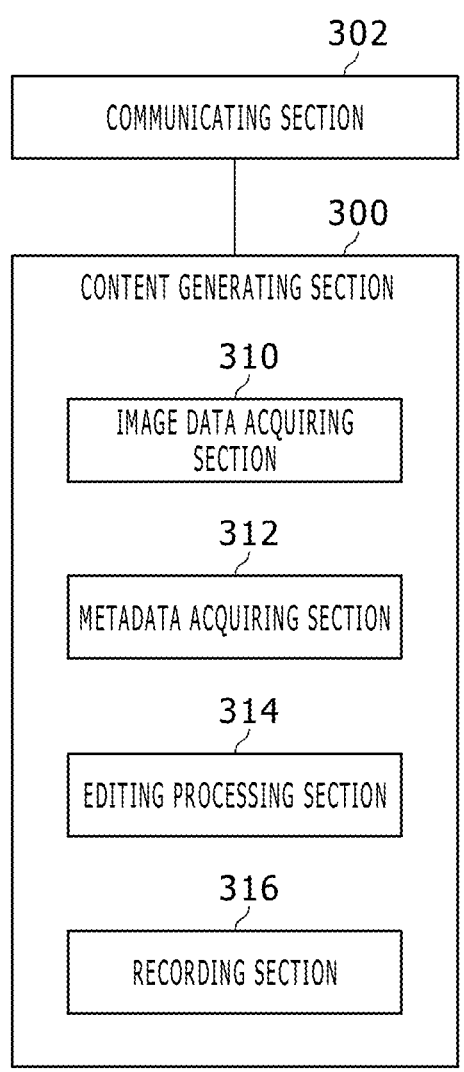
FIG. 8 is a schematic view showing an internal structure of an editing server.

FIG. 8 shows an internal structure of the editing server 16. The editing server 16 includes a content generating section 300 and a communicating section 302. The content generating section 300, which is connected to the network 3 via the communicating section 302, includes an image data acquiring section 310, a metadata acquiring section 312, an editing processing section 314, and a recording section 316. The components shown in FIG. 8 as the functional blocks configured to perform diverse processes may be configured by hardware in the form of circuit blocks, memories, and LSI for example, or by software using programs loaded into a memory for example. It will thus be appreciated by those skilled in the art that these functional blocks are configured by hardware only, by software only, or by a combination thereof in diverse forms and are not limited to any one of such forms.

The image data acquiring section 310 acquires the image data distributed by the information processing device 10 and records the acquired image data to the recording section 316. The image data is transmitted in real time and thus may be distributed live by the distribution server 14. When image data is being transmitted by the information processing device 10 to the distribution server 14 for live relay, the image data acquiring section 310 may acquire the image data from the distribution server 14.

The metadata acquiring section 312 acquires from the information processing device 10 the event code and the status data together with their respective time information. On the basis of the time information about the event code and about the event occurrence time, the editing processing section 314 edits the image data recorded in the recording section 316.

The functions of the metadata acquiring section 312, editing processing section 314, and recording section 316 in the content generating section 300 are the same as those of the metadata acquiring section 154, editing processing section 156, and ring buffer 176, respectively, in the information processing device 10 and thus will not be discussed further where redundant. The recording section 316 need not be a ring buffer and may have a larger storage area than the ring buffer 176. Thus the editing server 16 has the function of performing the image data editing process that is carried out inside the information processing device 10. The editing server 16, which performs the process of editing image data, has substantially the same image data editing function as the information processing device 10. In that sense, the editing server 16 may also be called an information processing device equipped with the function of performing the image data editing process.

Whether the image data editing process is to be performed by the information processing device 10 or by the editing server 16 may be determined in consideration of a process load balance of the information processing system 1. The editing processing section 314 identifies the start point and the end point for image data extraction on the basis of the event code, and acquires content data by extracting from the recording section 316 the image data from between the start point and the end point. The editing processing section 314 attaches to the content data the event code and status data acquired as metadata by the metadata acquiring section 312 over the period between the start point and the end point. The content data generated by the editing processing section 314 is sent to the content server 12 so that a plurality of users can download the content data for viewing. This allows the user's play video to be shared by many people, which is expected to raise the popularity of the game.

As described, the content server 12 has a plurality of pieces of content data stored therein. Because the content data is furnished with detailed metadata provided by the game program, the user is given an environment in which desired content can be downloaded by accessing the content server 12 through a browser and by entering relevant metadata as a search keyword.

Described below is how desired content is downloaded efficiently in accordance with the user's status.

<Content Receiving Function>

Figure 9:
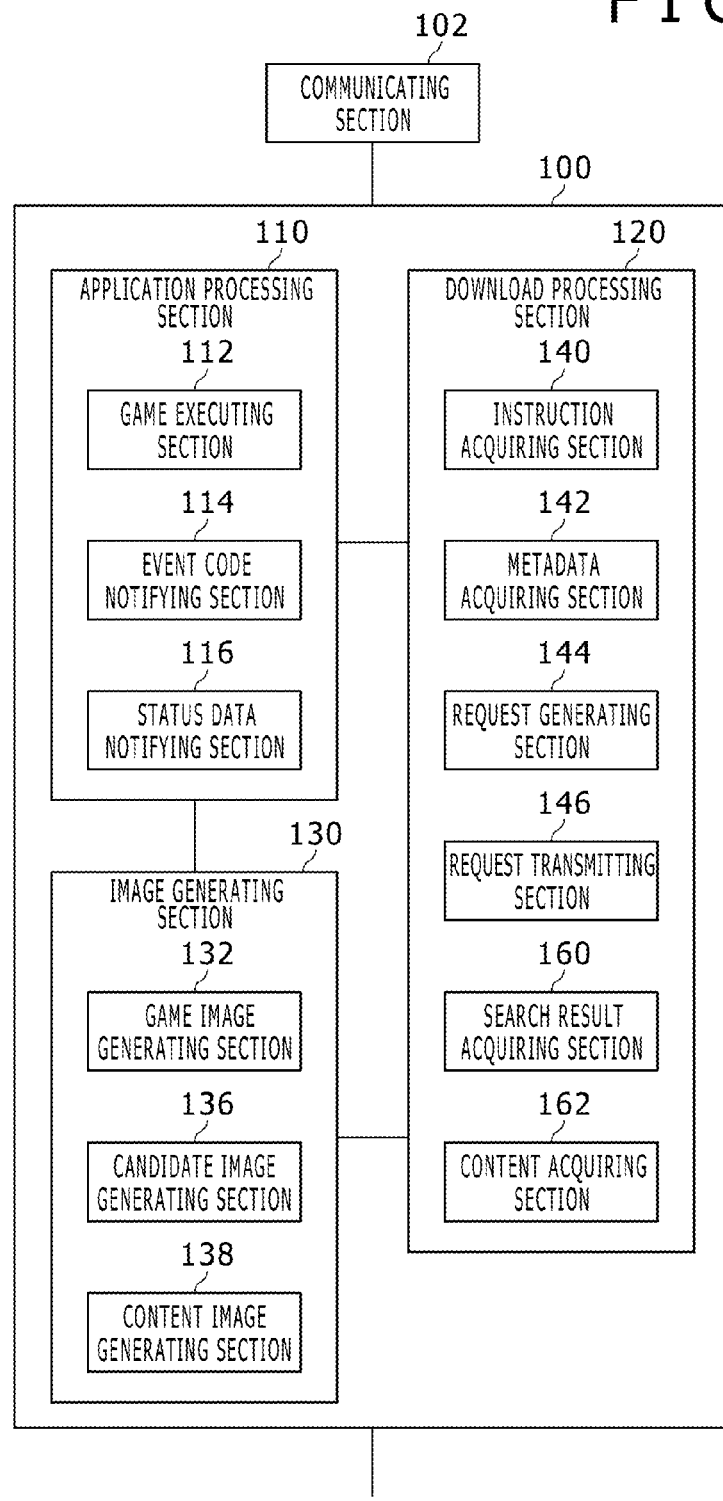
FIG. 9 is a schematic view showing an internal structure of an information processing device that implements a content receiving function.

FIG. 9 shows an internal structure of the information processing device 10 that implements the content receiving function. The information processing device 10 has the processing section 100 and communicating section 102. The processing section 100 includes the application processing section 110, the image generating section 130, and a download processing section 120. The application processing section 110 performs processes on applications. The image generating section 130 performs the process of generating images for display on the output device 4. The download processing section 120 performs the process of downloading content accumulated in the content server 12.

The components shown in FIG. 9 as the functional blocks configured to perform diverse processes may be configured by hardware in the form of circuit blocks, memories, and LSI for example, or by software using programs loaded into a memory for example. It will thus be appreciated by those skilled in the art that these functional blocks are configured by hardware only, by software only, or by a combination thereof in diverse forms and are not limited to any one of such forms. Of the reference numerals in FIG. 9, those already used in FIG. 4 designate like or corresponding functions. The communicating section 102 transmits and receives content-related requests and data to and from the content server 12.

Figure 10:
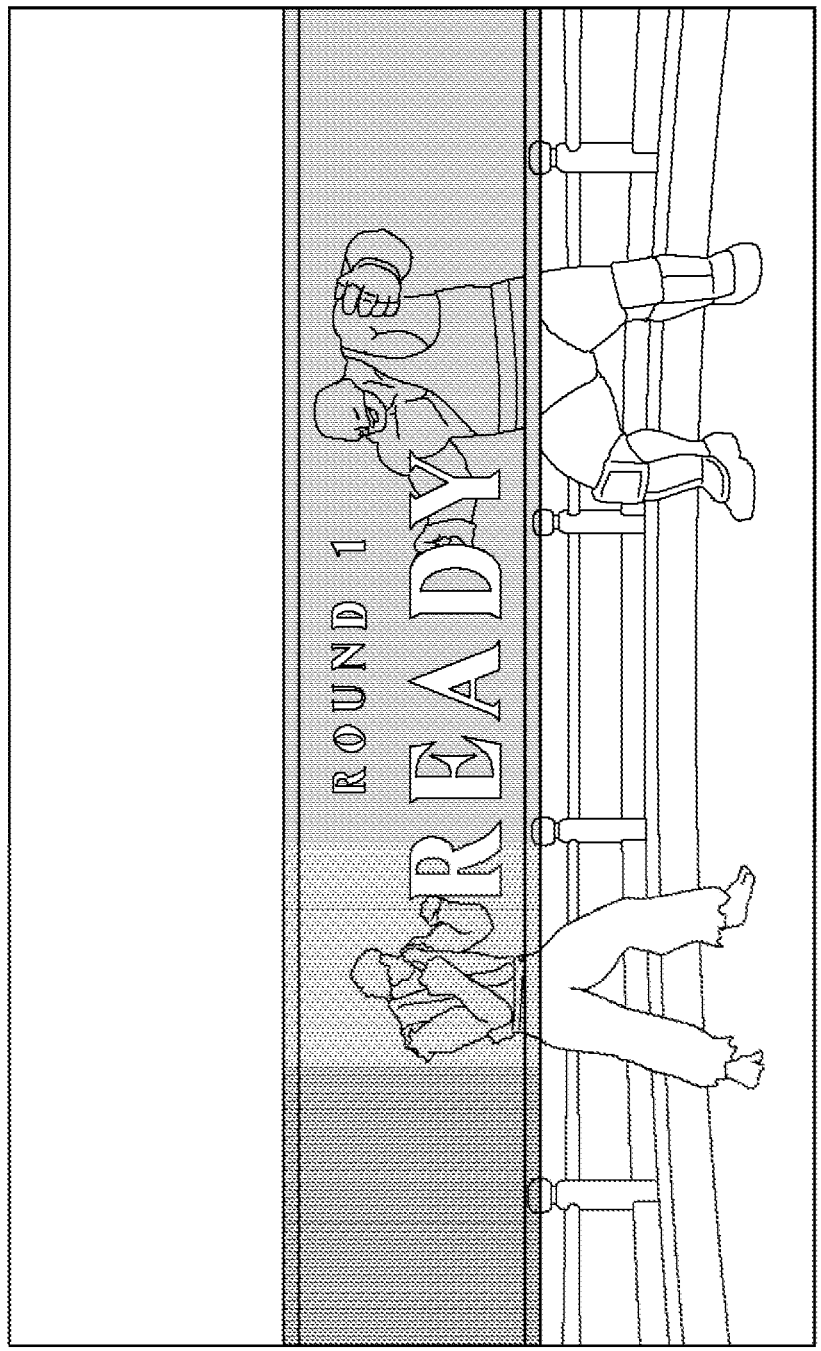
FIG. 10 is a schematic view showing a typical game screen.

The game executing section 112 in the application processing section 110 has the function of executing programs to make the game proceed in response to the user's operation input through the input device 6. The game image generating section 132 may be a GPU executing the rendering process, for example. Upon receipt of the result of processing from the game executing section 112, the game image generating section 132 generates the image data about the application (game) to be displayed on the output section 4. FIG. 10 shows a typical game screen displayed on the output device 4.

When any of the events set in the game program takes place during execution of the game, the event code notifying section 114 outputs an event code indicating the event occurrence to the download processing section 120. A metadata acquiring section 142 in the download processing section 120 acquires the event code notified. Events are set in each game. For example, a fighting game may have events such as "fight started," "physical strength halved," "remaining time 10 seconds," and "lethal move performed" set therein. The event code notifying section 114 has the function of notifying the content generating section 150 of the event code of any of such set events when it takes place. The status data notifying section 116 notifies the content generating section 150 of the status data about the game. The status data notifying section 116 may notify the content generating section 150 of the status data in response to a request from the latter. Alternatively, upon a change in the status for example, the status data notifying section 116 may notify the content generating section 150 of the changed status data. At this time, the status data notifying section 116 may give notification of the status data constituting the difference between the unchanged and the changed status data. Alternatively, the status data notifying section 116 may collect all changed status data and give notification thereof.

FIG. 10 shows a typical execution screen of a fighting game. The user starts the fighting game by operating the input device 6. At any point in time during the play, the user may operate the input device 6 to generate an instruction to search for the image data related to the current play status. For example, the user may generate the search instruction by operating the function button 80 to select a search button displayed on the menu screen. Alternatively, the user may generate the search instruction by operating a button to which the search function is assigned. Because the information processing device 10 of this embodiment is capable of recognizing the user's gesture through the camera 7, the user may perform a predetermined gesture to have the search instruction generated. In any case, once the search instruction is generated, an instruction acquiring section 140 receives the generated search instruction.

The metadata acquiring section 142 acquires the event code and status data indicative of the execution status of the application. Every time an event takes place, the event code notifying section 114 gives notification of the corresponding event code. Every time the status is changed, the status data notifying section 116 collects the status data and gives notification thereof. When the instruction acquiring section 140 receives the search instruction, the metadata acquiring section 142 sends as metadata the latest event code and the latest status data to a request generating section 144. In turn, the request generating section 144 generates a search request to search for the content that includes the latest event code and the latest status data as metadata. The request generating section 144 transmits the search request to the content server 12.

Because the request generating section 144 gets the event code and the status data included as metadata in the search request, the search request is embedded with various items of metadata representing the user's current play status. As mentioned above, the metadata always includes a title ID. For example, the status data about the fighting game may include the identity of the character used by the user, the identity of the opponent's character, the remaining physical strength of each of the characters, and the remaining time. The status data may further include the level representing the user's degree of skill or experience points as well as the opponent's level.

Figure 11:
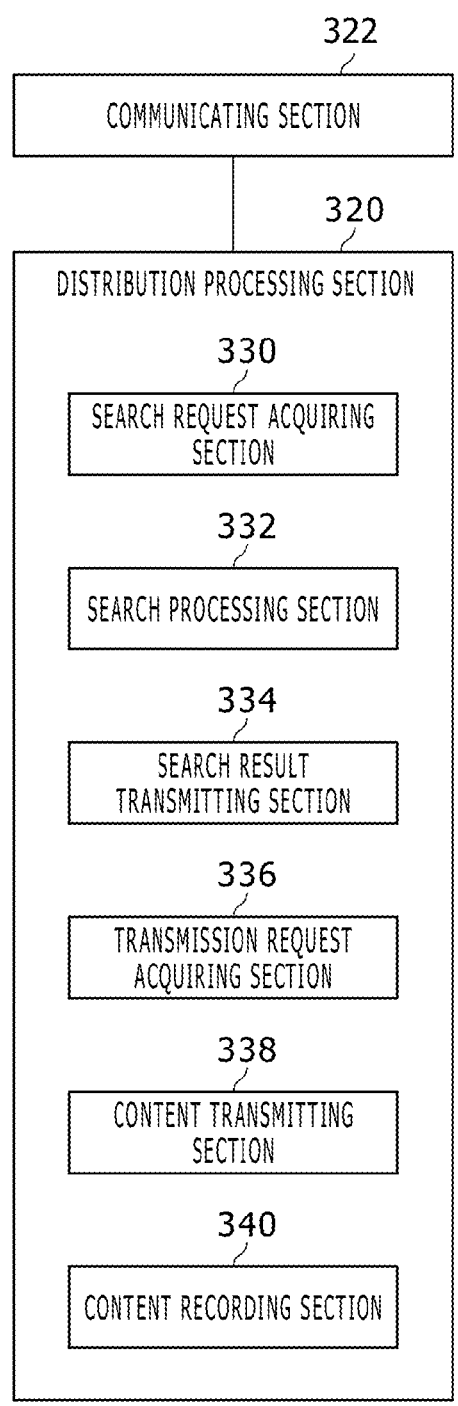
FIG. 11 is a schematic view showing an internal structure of a content server.

FIG. 11 shows a structure that summarizes the functions of the distribution server 14 and search server 18. What follows is an explanation of these functions on the assumption that the content server 12 possesses the functions. The content server 12 has a distribution processing section 320 and a communicating section 322. The distribution processing section 320, which is connected to the network 3 via the communicating section 322, includes a search request acquiring section 330, a search processing section 332, a search result transmitting section 334, a transmission request acquiring section 336, a content transmitting section 338, and a content recording section 340. If these functions were to be divided between the distribution server 14 and the search server 18, the search request acquiring section 330, search processing section 332, and search result transmitting section 334 might be included in the search server 18, while the transmission request acquiring section 336, content transmitting section 338, and content recording section 340 might be included in the distribution server 14. It should be noted that this is only an example. The content recording section 340 records the content data furnished with metadata. It is assumed that each item of content data is provided with a content ID uniquely identifying the content data item in the content recoding section 340. Whenever receiving content data, the content server 12 may attach a content ID to the received content data for identification.

The components shown in FIG. 11 as the functional blocks configured to perform diverse processes may be configured by hardware in the form of circuit blocks, memories, and LSI for example, or by software using programs loaded into a memory for example. It will thus be appreciated by those skilled in the art that these functional blocks are configured by hardware only, by software only, or by a combination thereof in diverse forms and are not limited to any one of such forms.

The search request acquiring section 330 in the content server 12 acquires a content search request sent from the information processing device 10. The search processing section 332 searches the content recording section 340 for content in accordance with the metadata included in the search request. Shown below are typical items of metadata included in the search request.
Title ID: XYZ
User name: A
Player character: TARO
Opponent character: JIRO
User level: 3
Player's remaining physical strength: 100%
Opponent's remaining physical strength: 100%

The search processing section 332 searches the content recording section 340 for the content having the metadata that matches these items of metadata. The content server 12 may prepare beforehand a database of extracted content metadata for search purposes. The search processing section 332 may then reference this database in carrying out the search process. The search processing section 332 first searches for the content having the same title ID. This step narrows the search targets to the videos of the same game.

The search processing section 332 retains high-priority metadata as a search condition for each game. The search processing section 332 may hold a file in which metadata priority is registered for each item of metadata. For example, if the highest priority is set to require that the player character and the opponent character are to be the same each, the search processing section 332 searches for the content in which the player character is set to be TARO and the opponent character is set to be JIRO.

Meanwhile, a viewing user may not find it interesting to watch a play video of another user whose level is quite different from that of the viewing user. Consequently, the highest priority may be set to require that the user's level be the same and the player character be the same. These settings cause the search processing section 332 to search for the content in which the player character is set to be TARO and the user level is set to be 3.

The priority of search conditions may thus be set as desired by each game maker. The priority is determined from the viewpoint of what kinds of videos the game maker wants the user to watch. The search processing section 332 may generate search results of a plurality of categories. For example, the search processing section 332 may generate a search result under the condition of the highest priority being set, a search result under the condition of a friend of the user's who sent a search request, a search result under the condition of a high evaluation by viewing users, and search results of other diverse categories. The search result transmitting section 334 transmits the content search result to the information processing device 10. The search result includes information about each item of content, such as a content ID, a still image of the content, the name of the user who posted the content, and the date and time of the post.

The search condition may be set for each scene in the game. For example, in an adventure game where the story progresses, the subsequent progress of the game is determined in response to the player character's action. When the game scene is currently a turning point of the story, the search processing section 332 may generate search results of a plurality of routes that may diverge from that point. The game may be configured to output an event code when the character is at a turning point in the story. In that case, the search processing section 332 may search for content metadata in accordance with the search condition linked to the event code.

A search result acquiring section 160 in the information processing device 10 acquires the content search result. This is the result of content search based on a plurality of items of metadata included in the search request. A candidate image generating section 136 generates, as the search result, images regarding a plurality of content items that are candidates to be downloaded, and outputs the generated images to the output device 4. This causes the game screen displayed on the output device 4 to be replaced with a download candidate list screen.

Figure 12:
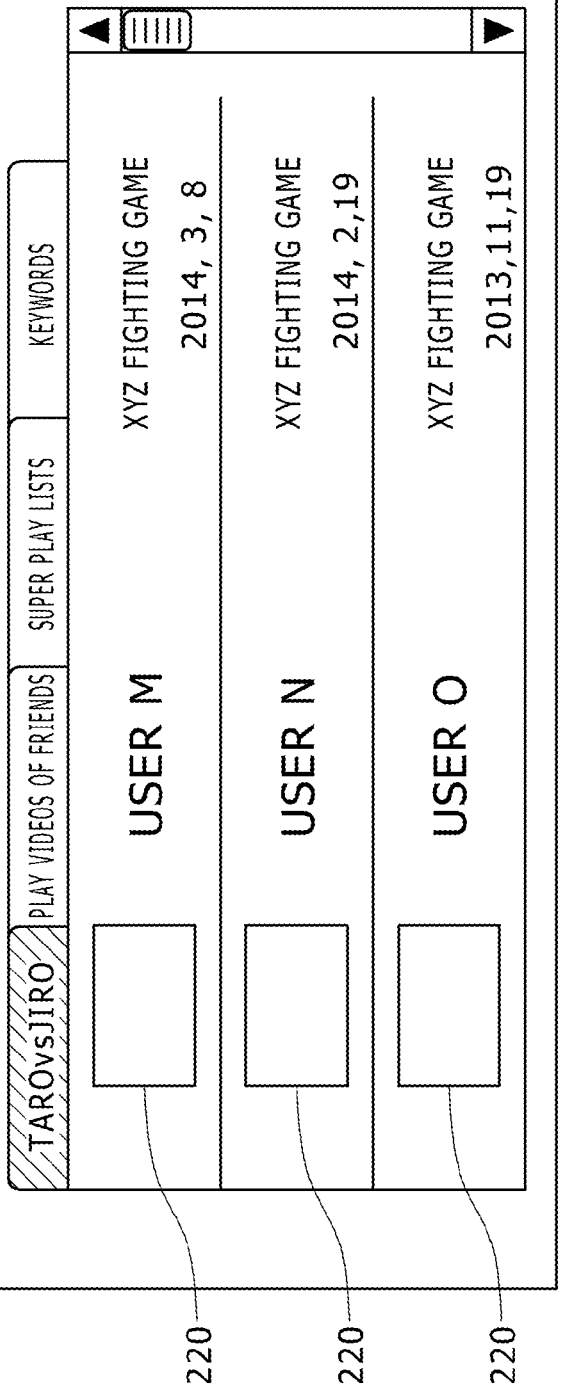
FIG. 12 is a schematic view showing a typical search result screen.

FIG. 12 shows a typical search result screen. The candidate image generating section 136 displays as the search result a list of images regarding a plurality of content items. On the search screen, captured images 220 are listed as still images of the content. Displayed on the side of each captured image 220 are the name of the posting user and the date and time of the post. The top of the list displays a plurality of search result tabs. The user can switch the search result for viewing by selecting any one of the tabs. A "keyword" tab is selected when the user inputs a new search keyword.

With the search result screen thus displayed, the user operates the input device 6 to select the content item desired to be downloaded. The instruction acquiring section 140 in the information processing device 10 receives a selection instruction that designates the content item. The selection instruction causes the request generating section 144 to generate a content transmission request that includes the content ID of the selected content item. A request transmitting section 146 transmits the generated content transmission request to the content server 12.

The transmission request acquiring section 336 in the content server 12 acquires the content transmission request. The content transmission request causes the content transmitting section 338 to read from the content recording section 340 the content data identified by the content ID included in the transmission request and transmit the retrieved content data to the information processing device 10.

Figure 13:
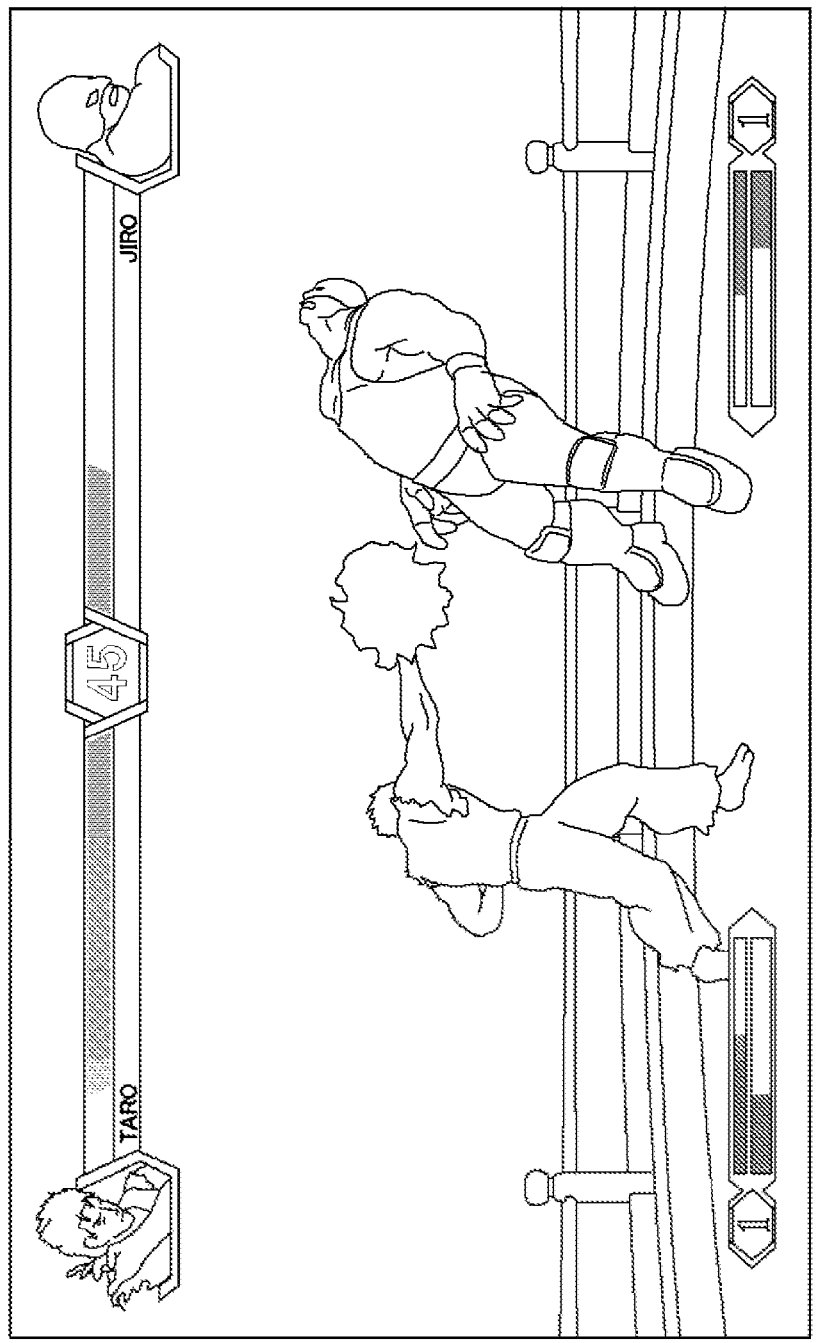
FIG. 13 is a schematic view showing a typical downloaded play video.
Figure 14:
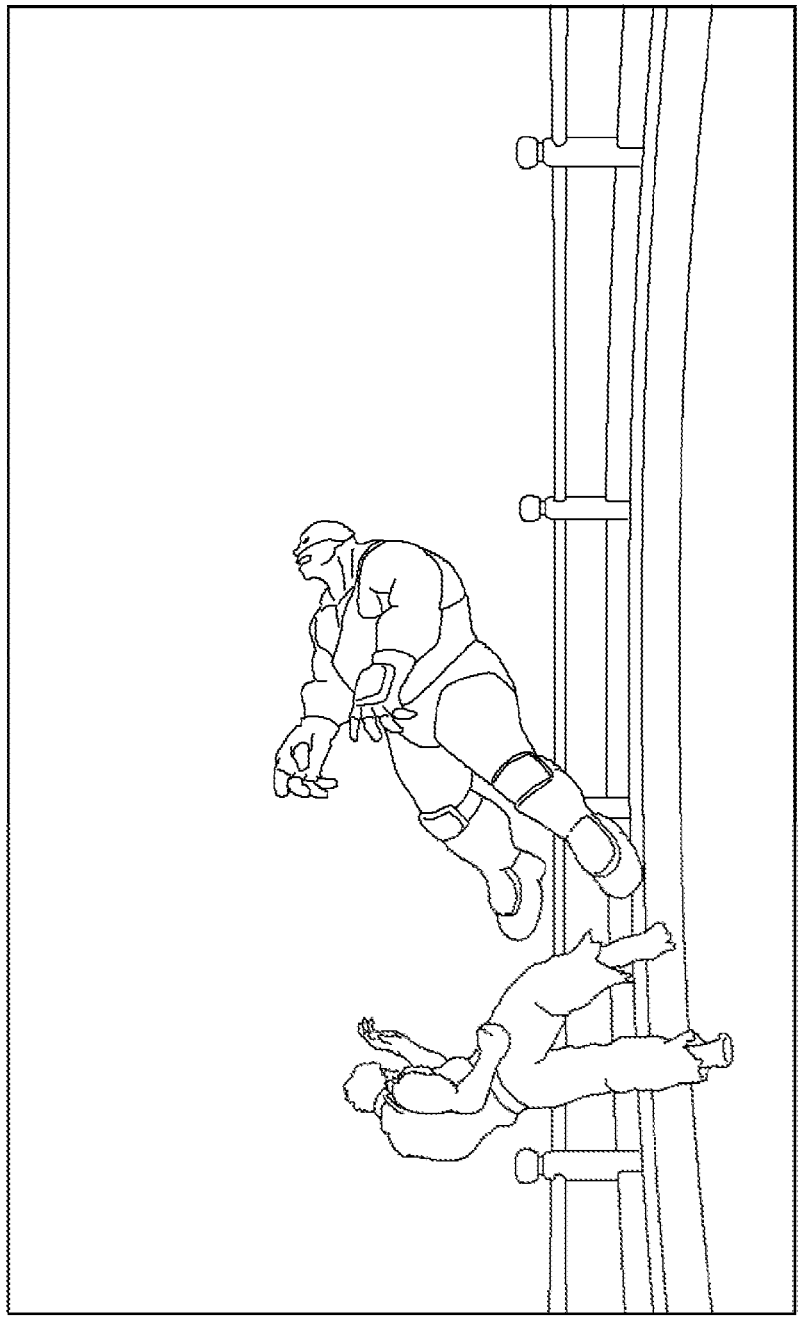
FIG. 14 is a schematic view showing another typical downloaded play video.

In the information processing device 10, a content acquiring section 162 acquires the content data. A content image generating section 138 generates an image of the acquired content and outputs the generated image to the output device 4. FIGS. 13 and 14 show typical play videos that have been downloaded. FIG. 13 shows the player character attacking the opponent character, and FIG. 14 depicts the player character knocking out the opponent character.

When the information processing device 10 automatically attaches to the content search request the metadata indicative of the current play status in detail, the content server 12 can perform a search process that matches the user's status. With each content item provided with detailed metadata, the content server 12 can enhance the granularity of search.

Whereas the present invention has been explained in conjunction with a specific embodiment given above as an example, it should be understood by those skilled in the art that the above-described composing elements and various processes may be combined in diverse ways and that such combinations, variations and modifications also fall within the scope of this invention.

With the above embodiment, it was explained that the information processing device 10 or the editing server 16 extracts image data during execution of the application to generate content data furnished with metadata. When the content data is generated and recorded to the content recording section 340 as described above, the distribution server 14 can instantaneously distribute to the information processing device 10 the content data requested to be transmitted.

In a variation of the embodiment, the content recording section 340 in the content server 12 may record the image data yet to be extracted in linkage with the metadata about the image data. The image data and the metadata may be recorded in separate recording devices. As described above in connection with the operation of the editing server 16 shown in FIG. 8, the transmission processing section 194 in the information processing device 10 transmits to the content server 12 the image data generated by the game image generating section 132. The transmission processing section 194 also transmits to the content server 12 the event code notified by the event code notifying section 114 together with the time information about the event occurrence time. The transmission processing section 194 further transmits to the content server 12 the status data notified by the status data notifying section 116 along with the time information about the status collection time. The transmission processing section 194 also transmits to the content server 12 the event code and status data acquired as metadata by the metadata acquiring section 154 while the image data is being transmitted to the content server 12.

In the content server 12, these data items (i.e., image data and metadata) are related to each other when recorded to the content recording section 340. With the embodiment above, it was explained that the editing server 16, upon acquiring an event code, edits the image data to generate the content data. In this variation, the editing server 16 at this point does not generate content data.

At this point, the search request acquiring section 330 may receive a search request from the user. The search request causes the search processing section 332 to reference the metadata recorded in the content recording section 340 to search for the content that matches the metadata included in the search request. The search result transmitting section 334 transmits the search result to the information processing device 10. The content is then selected on the information processing device 10, and the transmission request acquiring section 336 receives a content transmission request. At this point, the editing server 16 generates the content data by editing the image data on the basis of the event code as part of the metadata included in the search request. That is, the editing server 16 generates the content data by editing the image data after receiving the content transmission request. The content transmitting section 338 transmits the edited content data to the information processing device 10. In this manner, the editing server 16 generates the content data as needed. This contributes to reducing the load of the editing process.

In this variation, the transmission processing section 194 transmits the image data to the content server 12 in real time, whereas the metadata need not be transmitted in real time. That is, after completing the transmission of the image data, the transmission processing section 194 may transmit to the content server 12 the metadata acquired by the metadata acquiring section 154 during transmission of the image data. In another example, the image data need not be transmitted in real time by the information processing device 10. Instead, the image data and the metadata recorded by the information processing device 10 may be transmitted collectively to the editing server 16.

REFERENCE SIGNS LIST

1 Information processing system
10 Information processing device
12 Content server
14 Distribution server
16 Editing server
18 Search server
100 Processing section
102 Communicating section
110 Application processing section
112 Game executing section
114 Event code notifying section
116 Status data notifying section
120 Download processing section
130 Image generating section
132 Game image generating section
134 Edited image generating section
136 Candidate image generating section
138 Content image generating section
140 Instruction acquiring section
142 Metadata acquiring section
144 Request generating section
146 Request transmitting section
150 Content generating section
152 Instruction acquiring section
154 Metadata acquiring section
156 Editing processing section
160 Search result acquiring section
162 Content acquiring section
170 Recording section
172 recording controlling section
174 Writing/reading section
176 Ring buffer
190 Sharing processing section
192 Upload processing section
194 Transmission processing section
200 Editing screen
300 Content generating section
302 Communicating section
310 Image data acquiring section
312 Metadata acquiring section
314 Editing processing section
316 Recording section
320 Distribution processing section
322 Communicating section
330 Search request acquiring section
332 Search processing section
334 Search result transmitting section
336 Transmission request acquiring section
338 Content transmitting section
340 Content recording section

INDUSTRIAL APPLICABILITY

The present invention may be applied to the technical field in which the viewing of content images such as those of games is implemented.

The invention claimed is:

1. An information processing device comprising:
   a metadata acquiring section that acquires metadata indicative of a status of application execution from a currently executed application;
   an instruction acquiring section that receives a search instruction from a user;
   a request generating section that generates a search request for content including metadata;
   a request transmitting section that transmits the search request to a server;
   a content acquiring section that acquires content data from the server; and an image generating section that generates a moving image of the acquired content;
the application having a function of giving notification of a plurality of event codes,
wherein each event code is indicative of a unique occurrence of an event set in the application,
wherein occurrences of event codes are acquired as the metadata by the metadata acquiring section,
wherein, when the instruction acquiring section receives the search instruction, the metadata acquiring section providing the request generating section with the latest metadata having been acquired, the request generating section in turn generating the search request including the latest metadata,
wherein the image generating section does not generate the moving image until after the search request has been received.

2. The information processing device according to claim 1, further comprising:
a search result acquiring section that acquires a result of content search from the server;
the image generating section generating a single moving image regarding a plurality of content items as the result of search;
when the instruction acquiring section receives a selection instruction to designate a content item, the request transmitting section transmitting to the server a request to transmit the selected content item.

3. The information processing device according to claim 2,
wherein the search result acquiring section acquires the result of search for the content item retrieved in accordance with a plurality of metadata items included in the search request, and
wherein the single moving image is generated by the image generating section in accordance with the plurality of metadata items.

4. An information processing system comprising:
an information processing device and a server connected with one another via a network;
the information processing device including
a metadata acquiring section that acquires metadata indicative of a status of application execution from a currently executed application,
an instruction acquiring section that receives a search instruction from a user,
a request generating section that generates a search request for content including metadata,
a request transmitting section that transmits the search request to the server,
a search result acquiring section that acquires a result of content search from the server,
a first image generating section that generates moving images regarding a plurality of content items as the result of search in the server,
a content acquiring section that acquires content data from the server, and
a second image generating section that generates a single moving image of the acquired content,
wherein the second image generating section does not generate the single moving image until the content acquiring section acquires the content data from the server;
the application having a function of giving notification of an event code indicative of an occurrence of an event set in the application, the notified event code being acquired as the metadata by the metadata acquiring section,
when the instruction acquiring section receives the search instruction, the metadata acquiring section providing the request generating section with the latest metadata having been acquired, the request generating section in turn generating the search request including the latest metadata;
the server including
a content recording section that records the content data,
a search processing section that searches for content on the basis of the metadata included in the search request,
a first transmitting section that transmits the result of content search, and
a second transmitting section that transmits the content data.

5. An information processing device comprising:
a recording section that records moving image data of a currently executed application,
wherein the moving image data is continuously recorded using a ring buffer having a predetermined storage capacity;
a metadata acquiring section that acquires metadata indicative of a status of application execution from the currently executed application; and
a content generating section that automatically extracts, as content data, application image data ranging from a start point to an end point from the application image data recorded in the recording section,
wherein the start point is associated with a first detected event code in the currently executed application and the end point is associated with a second detected event code in the currently executed application,
wherein the first detected event code and the second detected event code are each distinct predetermined events that takes place during execution of the currently executed application;
the content generating section referencing time information indicative of a timing at which the metadata, the first detected event code, and the second detected event code were acquired, before attaching to the content data the metadata collected over a period from the start point to the end point,
wherein the metadata further includes any other event codes and time information of the other event codes, with the other event codes occurring between the start point and the end point.

6. The information processing device according to claim 5,
wherein the metadata acquiring section acquires, as the metadata, information related to a user using the application, and
the content generating section attaches the user-related information to the content data.

7. A content image generating method comprising:
acquiring metadata indicative of a status of application execution from a currently executed application;
receiving a search instruction from a user;
generating a search request for content including metadata;
transmitting the search request for content;
acquiring content data; and
generating a moving image of the acquired content;
the application having a function of giving notification of a plurality of event codes, wherein each event code is indicative of a different occurrence of an event set in the application, wherein occurrences of event codes are acquired as the metadata in the metadata acquiring;

when the search instruction is received, the search request generating the search request including the latest metadata having been acquired, wherein the moving image is not generated until after the search instruction is received.

8. A content data generating method comprising:

acquiring metadata indicative of a status of application execution from a currently executed application;

automatically extracting, as content data, moving image data ranging from a start point to an end point from a recording section recording the image data of the currently executed application, wherein the start point is associated with a first detected event code in the currently executed application and the end point is associated with a second detected event code in the currently executed application, wherein the moving image data is continuously recorded using a ring buffer having a predetermined storage capacity; and referencing time information indicative of a timing at which the metadata the first detected event code, and the second detected event code were acquired, before attaching to the content data the metadata collected over a period from the start point to the end point, wherein the first detected event code and the second detected event code are each distinct predetermined events that takes place during execution of the currently executed application, And wherein the metadata further includes any other event codes and time information of the other event codes, with the other event codes occurring between the start point and the end point.

9. A non-transitory computer readable medium having stored thereon a program for a computer, the program comprising:

by a metadata acquiring section, acquiring metadata indicative of a status of application execution from a currently executed application;

by an instruction acquiring section, receiving a search instruction from a user;

by a request generating section, generating a search request for content including metadata;

by a request transmitting section, transmitting the search request for content;

by a content acquiring section, acquiring content data; and by an image generating section, generating an image of the acquired content;

the application having a function of giving notification of a plurality of event codes wherein each event code is indicative of a unique occurrence of an event set in the application, wherein occurrences of event codes are acquired as the metadata by the metadata acquiring section;

wherein, when the search instruction is received, the search request generating the search request including the latest metadata having been acquired, and wherein the image generating section does not generate the moving image until after the search request has been received.

10. A non-transitory computer readable medium having stored thereon a program for a computer, the program comprising:

by a metadata acquiring section, acquiring metadata indicative of a status of application execution from a currently executed application;

by a content generating section, automatically extracting, as content data, moving image data ranging from a start point to an end point from a recording section recording the image data of the currently executed application, wherein the moving image data is continuously recorded using a ring buffer having a predetermined storage capacity; and by the content generating section, referencing time information indicative of a timing at which the metadata was acquired, before attaching to the content data the metadata collected over a period from the start point to the end point, wherein the start point is associated with a first detected event code in the currently executed application and the end point is associated with a second detected event code in the currently executed application, wherein the first detected event code and the second detected event code are each distinct predetermined events that takes place during execution of the currently executed application, and wherein the metadata further includes any other event codes and time information of the other event codes, with the other event codes occurring between the start point and the end point.

* * * * *